United States Patent
Uo

(10) Patent No.: US 8,761,599 B2
(45) Date of Patent: Jun. 24, 2014

(54) SEMICONDUCTOR DEVICE, METHOD FOR TESTING SAME AND TRANSMITTING CIRCUIT

(75) Inventor: Toyoaki Uo, Fukuoka-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 119 days.

(21) Appl. No.: 13/424,338

(22) Filed: Mar. 19, 2012

(65) Prior Publication Data

US 2013/0039648 A1 Feb. 14, 2013

(30) Foreign Application Priority Data

Aug. 12, 2011 (JP) ................................. 2011-176801

(51) Int. Cl.
*H04B 17/00* (2006.01)

(52) U.S. Cl.
USPC ............................. 398/25; 398/189; 398/194

(58) Field of Classification Search
USPC .............. 398/16, 25, 135, 136, 182, 189, 194
See application file for complete search history.

(56) References Cited

U.S. PATENT DOCUMENTS

| | | | |
|---|---|---|---|
| 5,815,298 A * | 9/1998 | Cern | 398/16 |
| 6,144,326 A | 11/2000 | Krone et al. | |
| 6,947,674 B2 * | 9/2005 | Hara et al. | 398/182 |
| 7,369,067 B2 * | 5/2008 | Kishi et al. | 341/53 |
| 2007/0075886 A1 | 4/2007 | Sakura et al. | |
| 2008/0265185 A1 | 10/2008 | Numano | |
| 2009/0073626 A1 | 3/2009 | Saitou | |
| 2011/0188864 A1 | 8/2011 | Uo | |

FOREIGN PATENT DOCUMENTS

| | | |
|---|---|---|
| EP | 1715586 | 10/2006 |
| JP | 2000324181 A | 11/2000 |
| JP | 2006-303663 | 11/2006 |
| WO | 2010/014085 | 2/2010 |

OTHER PUBLICATIONS

European Search Report dated Nov. 21, 2012 filed in European Counterpart Application No. 12160567.9, 6 pages.
Japanese Office Action dated Mar. 4, 2014, filed in Japanese counterpart Application No. 2011-176801, 4 pages (with translation).

* cited by examiner

*Primary Examiner* — Dalzid Singh
(74) *Attorney, Agent, or Firm* — Patterson & Sheridan, LLP

(57) ABSTRACT

According to an embodiment, a semiconductor device includes an analog/digital conversion unit, a pulse width modulation unit outputting a transmission signal, the transmission signal being a pulse pattern corresponding to a digital signal output from the analog/digital conversion unit, a reference signal generation unit generating a reference signal, the reference signal being a fixed pulse pattern. The device includes a first control unit selecting one of the transmission signal and the reference signal, a light emitting element drive unit outputting a drive current based on the transmission signal or the reference signal, a light emitting element driven by the light emitting element drive unit. The device includes an optical receiving unit converting the optical signal into a voltage signal, and a demodulation unit demodulating the voltage signal into a digital signal based on the transmission signal or the reference signal.

20 Claims, 14 Drawing Sheets

| | FIRST INPUT TERMINAL | SECOND INPUT TERMINAL | OPERATING STATE |
|---|---|---|---|
| I | $V_{INL}<V_{IN1}<V_{INH}$ (ANALOG SIGNAL) | $V_{INL}<V_{IN2}<V_{INH}$ (ANALOG SIGNAL) | TRANSMITTING MODE |
| II | $V_{TH1}<V_{IN1}<V_{TH2}$ (DRIVE CONTROL CIRCUIT 1) | $V_{INL}<V_{IN2}<V_{INH}$ (ANALOG SIGNAL) | TESTING MODE (MEASURE PULSE WIDTH DISTORTION) |
| III | $V_{TH2}<V_{IN1}$ (DRIVE CONTROL CIRCUITS 1 AND 3) | $V_{INL}<V_{IN2}<V_{INH}$ (ANALOG SIGNAL) | TESTING MODE (MEASURE DIRECT CURRENT SENSITIVITY: NO LIGHT EMISSION) |
| IV | $V_{INL}<V_{IN1}<V_{INH}$ (ANALOG SIGNAL) | $V_{TH3}<V_{IN2}<V_{TH4}$ (DRIVE CONTROL CIRCUIT 2) | TESTING MODE (CHANGE DRIVE CURRENT AND PULSE WIDTH OF TRANSMISSION SIGNAL) |
| V | $V_{TH1}<V_{IN1}<V_{TH2}$ (DRIVE CONTROL CIRCUIT 1) | $V_{TH3}<V_{IN2}<V_{TH4}$ (DRIVE CONTROL CIRCUIT 2) | TESTING MODE (MEASURE PULSE WIDTH DISTORTION: DEGRADATION OVER TIME) |
| VI | $V_{TH2}<V_{IN1}$ (DRIVE CONTROL CIRCUITS 1 AND 3) | $V_{TH3}<V_{IN2}<V_{TH4}$ (DRIVE CONTROL CIRCUIT 2) | TESTING MODE |
| VII | $V_{INL}<V_{IN1}<V_{INH}$ (ANALOG SIGNAL) | $V_{TH4}<V_{IN2}$ (DRIVE CURRENT SOURCE) | TESTING MODE |
| VIII | $V_{TH1}<V_{IN1}<V_{TH2}$ (DRIVE CONTROL CIRCUIT 1) | $V_{TH4}<V_{IN2}$ (DRIVE CURRENT SOURCE) | TESTING MODE |
| IX | $V_{TH2}<V_{IN1}$ (DRIVE CONTROL CIRCUITS 1 AND 3) | $V_{TH4}<V_{IN2}$ (DRIVE CURRENT SOURCE) | TESTING MODE (MEASURE DIRECT CURRENT SENSITIVITY) |

SEMICONDUCTOR DEVICE, METHOD FOR TESTING SAME AND TRANSMITTING CIRCUIT

CROSS-REFERENCE TO RELATED APPLICATIONS

This application is based upon and claims the benefit of priority from Japanese Patent Application No. 2011-176801, filed on Aug. 12, 2011; the entire contents of which are incorporated herein by reference.

FIELD

Embodiments are related generally to a semiconductor device, a method for testing the same and a transmitting circuit.

BACKGROUND

Insulating circuits that have large noise immunity and are capable of transmitting analog signals with high integrity are necessary in semiconductor devices used to control power devices. Although semiconductor devices including optically-coupled insulating circuits such as photocouplers and the like that optically transmit signals have excellent noise immunity because the output is completely electrically insulated from the input, such semiconductor devices are not suited to the transmission of analog signals. For example, although IC output-type photocouplers that include a signal processing circuit on the receiving side are used widely to transmit digital signals, analog signals cannot be transmitted with high integrity. Also, insulating circuits such as transistor couplers, etc., that are used to transmit analog signals unfortunately have distortion of the signal waveform caused by nonlinearity and are not suited to transmitting analog signals with high integrity.

Therefore, technology has been developed to add an analog/digital (AD) conversion circuit to the transmitting side of the optically-coupled insulating circuit to transmit the analog signal with high integrity. In other words, the effect of the nonlinearity of the optical coupling unit can be avoided when transmitting by converting the analog input into a digital signal; and the analog transmission is possible with high integrity.

In the case where a delta-sigma conversion circuit is used as the analog/digital conversion circuit, it is desirable to increase the clock frequency of the AD conversion to transmit the information included in the analog signal with high integrity. To have one optical signal path in the optically-coupled insulating circuit, a modulation circuit to superimpose the sampling clock and the digital data into a signal of one series is used in the analog/digital conversion circuit. When the optical transmission is performed using pulse width modulation as the modulation method, there are cases where demodulation errors occur on the receiving side due to pulse width distortion as the sampling clock frequency approaches the response limit of the optical coupling unit. Therefore, an optically-coupled insulating circuit capable of suppressing the demodulation errors by ensuring the transmission margin of the optical coupling unit and realizing signal transmission with high integrity and a semiconductor device including such an optically-coupled insulating circuit are necessary.

BRIEF DESCRIPTION OF THE DRAWINGS

FIG. 18 is a table illustrating operation modes of the semiconductor device according to the fifth embodiment.

DETAILED DESCRIPTION

Figure 1:
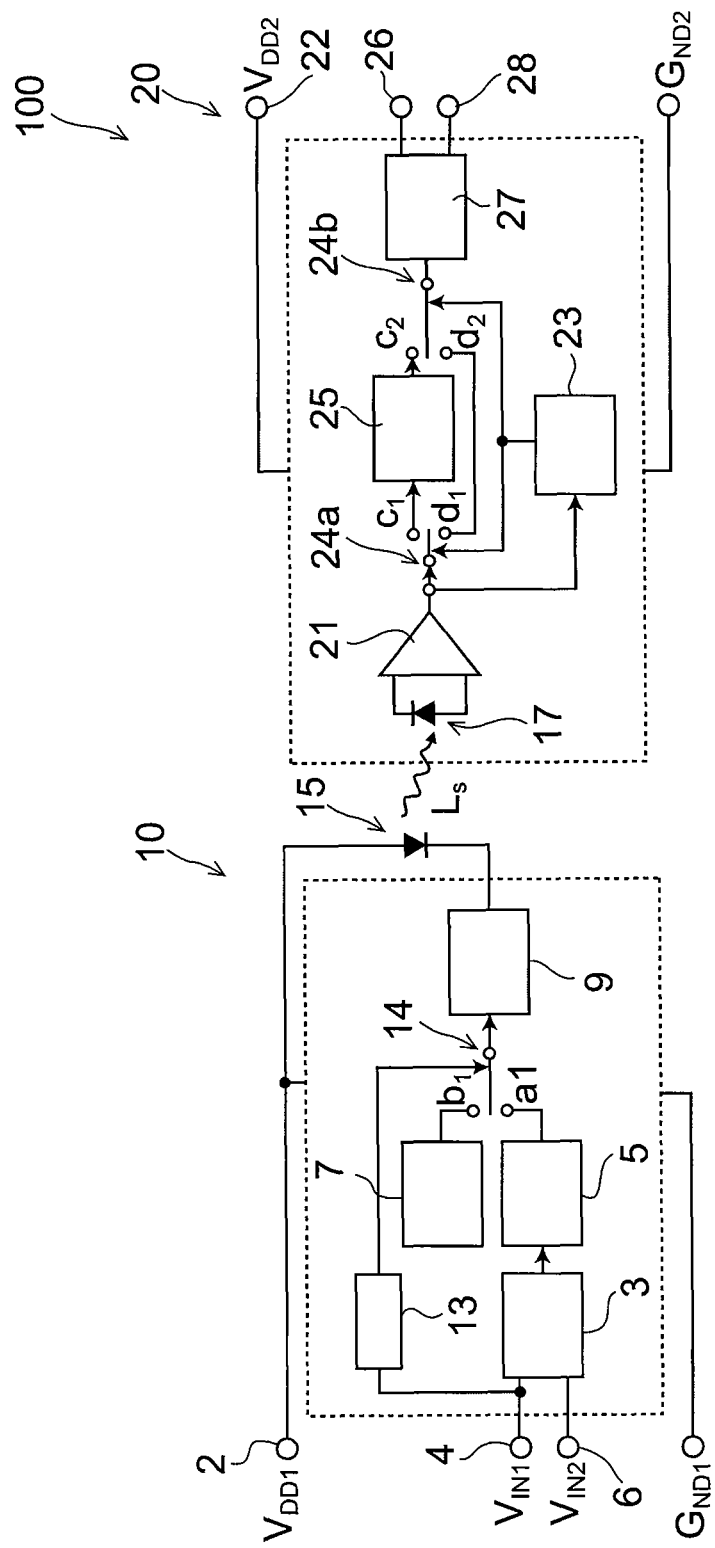
FIG. 1 is a schematic view illustrating a semiconductor device according to a first embodiment.

According to an embodiment, a semiconductor device includes an analog/digital conversion unit converting an analog signal into a digital signal, a pulse width modulation unit outputting a transmission signal, the transmission signal being a pulse pattern corresponding to the digital signal output from the analog/digital conversion unit, a reference signal generation unit generating a reference signal, the reference signal being a fixed pulse pattern. The device includes a first control unit selecting one of the transmission signal and the reference signal, a light emitting element drive unit outputting a drive current based on the transmission signal or the reference signal selected by the first control unit, a light emitting element driven by the light emitting element drive unit to emit an optical signal based on the transmission signal or the reference signal. The device includes an optical receiving unit converting a photocurrent of a light receiving element receiving the optical signal into a voltage signal, and a demodulation unit demodulating the voltage signal into a digital signal based on the transmission signal or the reference signal.

Embodiments of the invention will now be described with reference to the drawings. Similar portions in the drawings are marked with like numerals; a detailed description thereof is omitted as appropriate; and portions that are different are described as appropriate.

First Embodiment

FIG. 1 is a schematic view illustrating the configuration of a semiconductor device 100 according to a first embodiment. The semiconductor device 100 includes a transmitting unit 10, a receiving unit 20, and an insulating circuit including an optical coupling via a light emitting element 15 and a light receiving element 17.

The transmitting unit 10 includes, for example, a first grounding terminal $G_{ND1}$, a power source terminal 2, a negative phase input terminal 6, and a positive phase input terminal 4 configured to detect a differential input signal. The transmitting unit 10 further includes an analog/digital (AD) conversion unit 3, a pulse width modulation unit 5, a reference signal generation unit 7, and a light emitting element drive unit 9 drives the light emitting element 15.

For example, a differential input signal or a single-phase input signal is input to the AD conversion unit 3 according to the embodiment. In the case of a single-phase input signal, the single-phase input signal is input to the input terminal 4 or the input terminal 6. In the case of a differential input signal, the differential analog signal that is input from the positive phase input terminal 4 and the negative phase input terminal 6 which are connected to the input of the AD conversion unit 3 is converted into a digital data signal based on a prescribed clock signal. In the pulse width modulation unit 5, the digital data signal output from the AD conversion unit 3 is superimposed onto the clock signal to be encoded and converted into a transmission signal having a first average duty ratio.

The reference signal generation unit 7 generates a reference signal having a second average duty ratio. The reference signal is, for example, a pulse that is synchronous with the clock of the AD conversion unit 3 and is a signal having a fixed pulse pattern. This duty ratio (the second average duty ratio) differs from the first average duty ratio.

The semiconductor device 100 has a transmitting mode in which an analog signal is converted into a digital signal and transmitted and a testing mode in which, for example, the pulse distortion is tested. A first control unit 13 switches between the transmitting mode and the testing mode. The first control unit 13 selects one from the transmission signal and the reference signal by, for example, controlling a switch 14 based on the voltage input to the input terminal 4.

In the initial state (the transmitting mode), for example, the switch 14 is connected to an output side $a_1$ of the pulse width modulation unit 5. For example, when a voltage level $V_{IN1}$ of the input terminal 4 exceeds a prescribed threshold value $V_{TH1}$, the control unit 13 switches the switch 14 from the $a_1$ side to an output side $b_1$ of the reference signal generation unit 7. This is returned to the $a_1$ side when the voltage level $V_{IN1}$ of the input terminal 4 becomes $V_{TH1}$ or less.

In the transmitting mode, the switch 14 is connected to the $a_1$ side; and the transmission signal is input from the pulse width modulation unit 5 to the light emitting element drive unit 9. The light emitting element drive unit 9 causes a light emitting element drive current to flow in the light emitting element 15 based on the transmission signal; and an optical signal $L_s$ that includes the transmission signal is emitted from the light emitting element 15.

In the testing mode, the switch 14 is connected to a $b_1$ side; and the reference signal is input from the reference signal generation unit 7 to the light emitting element drive unit 9. The light emitting element drive unit 9 causes a drive current to flow in the light emitting element 15 based on the reference signal; and the optical signal $L_s$ that includes the reference signal is emitted from the light emitting element 15.

The receiving unit 20 includes the light receiving element 17 configured to receive the optical signal $L_s$ and an optical receiving unit 21 configured to convert the output current of the light receiving element 17 into a voltage signal. The receiving unit 20 includes a second power source terminal 22 and a second grounding terminal $G_{ND2}$ and is electrically isolated from the transmitting unit 10. The receiving unit 20 further includes an average duty ratio detection unit 23, a demodulation unit 25, and a buffer 27.

The average duty ratio detection unit 23 assigns the voltage signal output from the optical receiving unit 21 to the transmission signal or the reference signal based on at least one selected from the first average duty ratio and the second average duty ratio. In other words, the average duty ratio detection unit 23 detects the average duty ratio of the output voltage signal of the optical receiving unit 21 and controls switches 24a and 24b based thereon.

For example, if the detected average duty ratio is equal to the first average duty ratio, the average duty ratio detection unit 23 recognizes the voltage signal to be the transmission signal, connects the switch 24a to a $c_1$ side, and connects the switch 24b to a $c_2$ side. Thereby, the voltage signal assigned to the transmission signal is input to the demodulation unit 25. Then, the demodulation unit 25 demodulates the voltage signal into the digital data signal and the clock signal and outputs the digital data signal and the clock signal.

The digital data signal and the clock signal demodulated by the demodulation unit 25 are output to terminals 26 and 28 via the buffer 27. For example, the clock signal is output from the terminal 26; and the digital data signal is output from the terminal 28.

If the average duty ratio of the voltage signal output from the optical receiving unit 21 is equal to the second average duty ratio, the duty ratio detection unit 23 recognizes the voltage signal to be the reference signal, connects the switch 24a to a $d_1$ side, and connects the switch 24b to a $d_2$ side. Thereby, the voltage signal output from the optical receiving unit 21 is output to the terminal 26 or 28 via the buffer 27.

The processing of the voltage signal of the duty ratio detection unit 23 is not limited to the example recited above. For example, the reference duty ratio may be taken to be a value between the first average duty ratio and the second average duty ratio; and the voltage signal may be assigned to the transmission signal or the reference signal based on the size relationship between the reference duty ratio and the average duty ratio of the voltage signal.

Here, for example, in the case where the reference signal has a fixed pulse width or pulse period and the pulse width or pulse period is known, the pulse width distortion (in the optical coupling unit) occurring between the input side of the light emitting element drive unit 9 and the output side of the optical receiving circuit 21 can be measured by measuring the pulse width of the voltage signal output from the terminal 26 or 28. For example, in the case where the pulse period is unknown but the pulse width of the reference signal is always 1/N of the pulse period, the pulse width distortion can be determined by measuring the pulse period and the pulse width of the voltage signal output from the terminal 26 or 28 and performing the calculation recited below.

$$\Delta W = \left(\frac{Wpm}{Tpm} - \frac{1}{N}\right) \times Wpm \qquad (1)$$

Here, $\Delta W$ is the pulse width distortion, Wpm is the measured pulse width, and Tpm is the measured pulse period.

Although it is a premise of the formula recited above that the pulse width of the reference signal is 1/N of the pulse period, such a pulse can be easily realized by processing a faster clock pulse using a counter circuit and the like.

As recited above, in the testing mode, the semiconductor device 100 transmits the reference signal generated by the transmitting unit via the optical coupling unit to output the voltage signal that includes the pulse width distortion. Thereby, it is possible to measure the pulse width distortion occurring in the optical coupling unit; and the transmission margin of the optical coupling unit can be tested.

For the components enclosed with the broken lines illustrated in FIG. 1, it is possible to integrate the components of the transmitting unit 10 into one semiconductor chip and integrate the components of the receiving unit 20 into one semiconductor chip. The transmitting unit 10 may include, for example, an integrated circuit (a transmitting IC) that includes the input terminals 4 and 6, the AD conversion circuit 3, the pulse width modulation circuit 5, the reference signal generation circuit 7, the light emitting element drive circuit 9, the control circuit 13, and the switch circuit 14 controlled by the control circuit 13.

On the other hand, the receiving unit 20 may include a receiving IC that includes the optical receiving circuit 21, the average duty ratio detection circuit 23, the demodulation circuit 25, and the switch circuits 24a and 24b controlled by the duty ratio detection circuit 23. The light receiving element 17 may be a single body integrated with the other components of the receiving IC or may be separate body and may be electrically connected to the input side of the receiving IC.

Thus, the semiconductor device 100 can be downsized by using ICs in which the components are integrated. Also, the voltage signal that includes the transmission signal or the reference signal is output to the terminal 26 or 28 via the buffer 27 by inputting a prescribed voltage to the input terminal 4 to switch between the transmitting mode and the testing mode. Accordingly, a terminal for the testing mode is not added to the semiconductor device 100 in addition to the analog signal input terminal. Therefore, the device size can be reduced.

Figure 12:
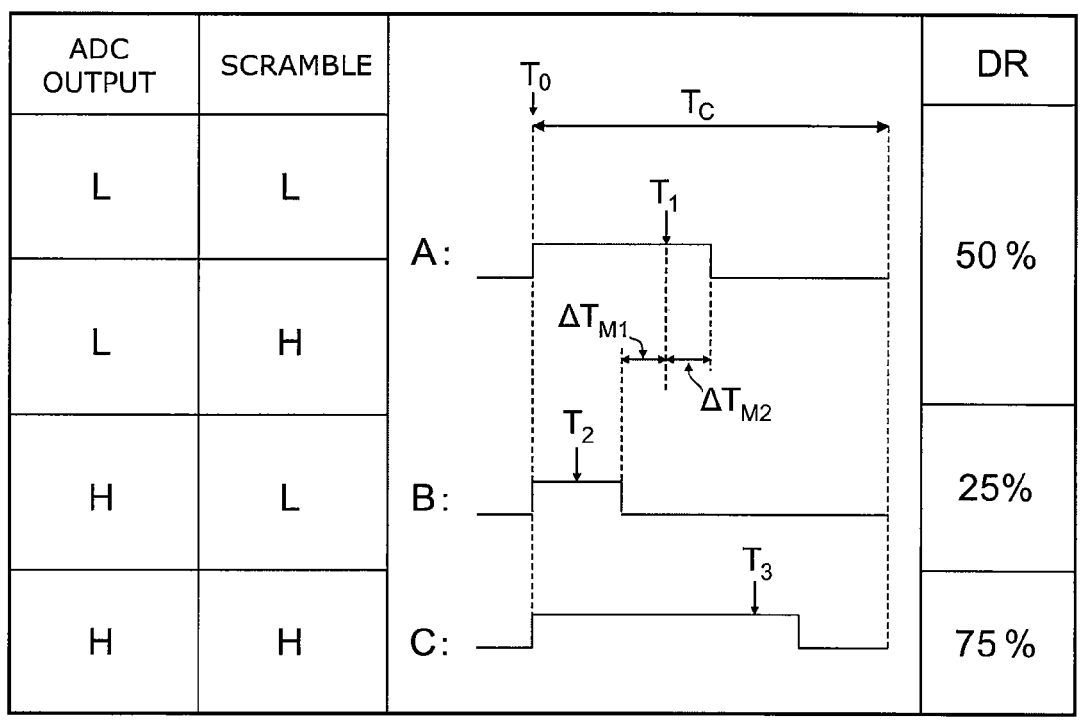
FIG. 12 is a chart illustrating one encoding scheme in a pulse width modulation unit.

The pulse width modulation according to the embodiment will now be described with reference to FIG. 12. FIG. 12 illustrates one encoding scheme of the pulse width modulation unit 5 but is not limited thereto.

The analog signal input to the input terminals 4 and 6 of the transmitting unit 10 is converted into a digital signal in the AD conversion unit 3. For example, an input differential signal input to the input terminals 4 and 6 is sampled based on a prescribed clock signal and is converted into a one-bit digital data signal by a $\Delta\Sigma$-type AD conversion circuit. The pulse width modulation unit 5 performs pulse width modulation in which the digital data signal is superimposed onto the clock signal.

For example, modulation to the three pulse patterns A to C illustrated in FIG. 12 is performed by superimposing a scrambling signal on the digital data signal (the ADC output) of the AD conversion unit 3. FIG. 12 illustrates the ADC output of one bit; and a signal in which the average duty ratio is guaranteed such as a 01 alternating signal or an one bit pseudo-random signal based on the clock signal or the like is used as the scrambling signal.

As illustrated in FIG. 12, for example, the duty ratio is 50% (pattern A) in the case where the ADC output is "L" when the scramble is "L" or "H." On the other hand, in the case where the output of the ADC is "H" and the scramble is "L," the duty ratio is 25% (pattern B). In the case where the ADC output is "H" and the scramble is "H," the duty ratio is 75% (pattern C). Thereby, the first average duty ratio of the transmission signal can be 50%. The digital data is superimposed onto the clock signal by causing an up edge $T_0$ of the pulse patterns A to C to match a clock period $T_C$.

In the demodulation unit 25 of the receiving unit 20, the clock signal is reproduced by detecting the up edge $T_0$ of the pulse patterns. The voltage signal (the transmission signal) is demodulated into the digital data signal by sensing the voltage level at identification points $T_1$ to $T_3$ illustrated in FIG. 12 by using the reproduced clock signal. The identification points $T_1$ to $T_3$ can be easily generated using the reproduced clock signal with a DLL (Digital Locked Loop) circuit and the like.

On the other hand, margins are necessary between the identification points $T_1$ to $T_3$ and the down edges of the pulse patterns A to C so that a bit error does not occur when demodulating the transmission signal into the digital data signal. For example, at the identification point $T_1$ of pattern A, it is desirable to ensure a margin $\Delta T_{M1}$ to the down edge of pattern B and a margin $\Delta T_{M2}$ to the down edge of pattern A. For example, if the pulse patterns illustrated in FIG. 12 are transmitted without distortion, the margins $\Delta T_{M1}$ and $\Delta T_{M2}$ are ⅛ of the clock period $T_C$.

Thus, by using a modulation method that superimposes the ADC output and the scrambling signal, the average duty ratio of the transmission signal can be constant and the configuration of the receiving circuit can be simplified. On the other hand, there is also the disadvantage that the margins decrease when demodulating the transmission signal.

If the pulse width distortion of the optical coupling unit is sufficiently smaller than the margins $\Delta T_{M1}$ and $\Delta T_{M2}$, an error-free signal transmission in which the bit error rate is suppressed can be realized. However, in the case where the sampling clock frequency of a delta-sigma converter is increased to perform the analog/digital conversion of the input analog signal with high integrity, the margins $\Delta T_{M1}$ and $\Delta T_{M2}$ decrease; and there are cases where a state is reached in which the demodulation error due to small pulse width distortion, signal jitter, and the like cannot be ignored.

In the case where an AD conversion is used such as by a $\Delta\Sigma$-type AD conversion circuit in which the output pattern is not always unique, it is difficult to control the pulse pattern output from the pulse width modulation unit 5. Therefore, it is difficult to measure the pulse distortion of the signal because the output pulse pattern is not always unique even in the case where a configuration is used in which it is possible to directly extract the voltage signal that includes the transmission signal from the optical receiving unit 21.

Conversely, in the semiconductor device 100 according to the embodiment, the pulse width distortion can be easily measured by transmitting the reference signal having the fixed pulse width in the testing mode. Then, in the test of the manufacturing process of the semiconductor device 100, it is possible to remove devices having large pulse width distortions. Thereby, demodulation errors can be suppressed by ensuring the transmission margin of the optical coupling unit of the semiconductor device 100; and signal transmission in which an analog signal is digitized with high integrity can be realized.

Although an encoding scheme is illustrated in the example recited above in which the average duty ratio of the transmission signal is fixed at 50%, the embodiment is not limited to the case where the average duty ratio is fixed at 50%; and it is sufficient for the average duty ratio of the transmission signal not to duplicate the average duty ratio of the reference signal.

Figure 15:
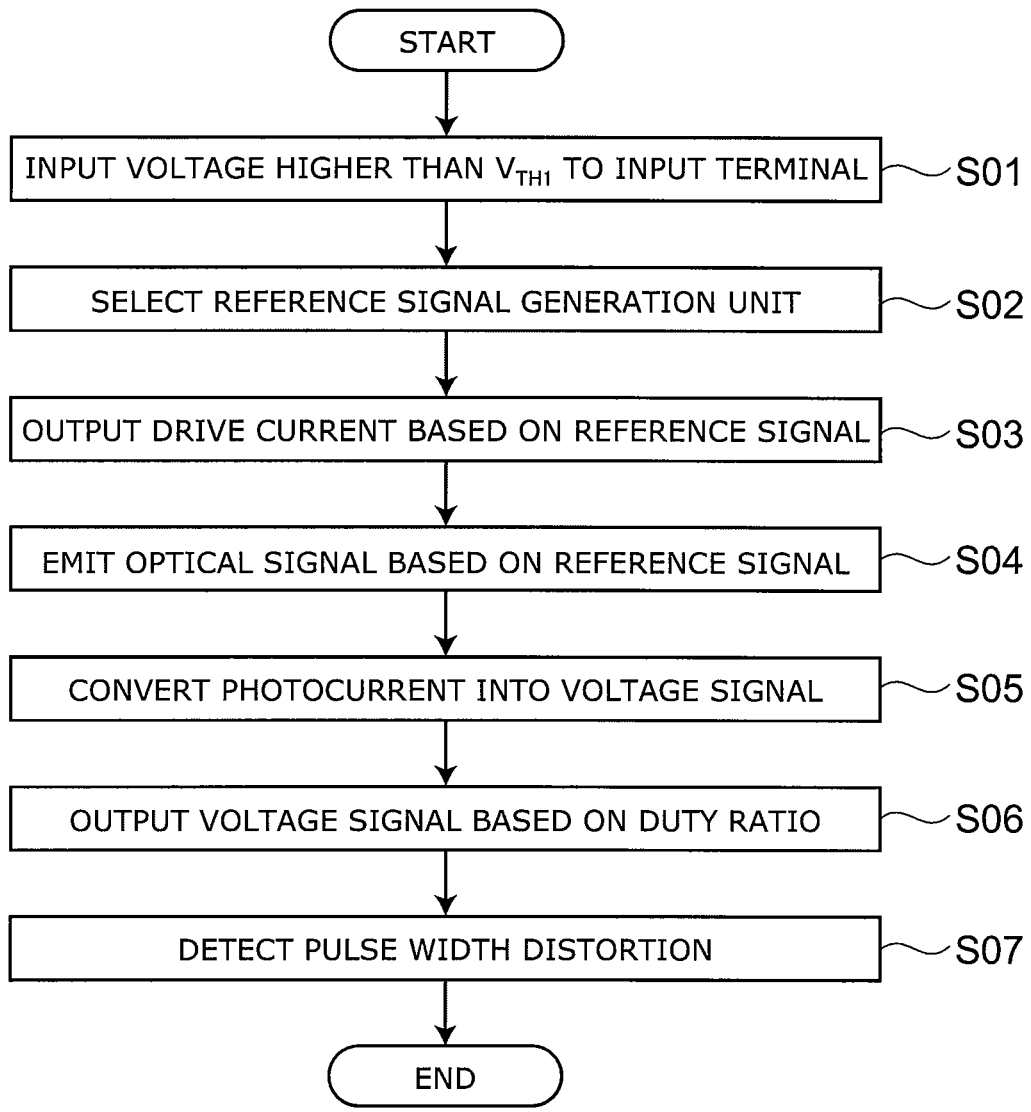
FIG. 15 is a flowchart illustrating a method for testing the semiconductor device according to the first embodiment.

A method for testing the semiconductor device 100 will now be described in detail with reference to the flowchart of FIG. 15.

Initially, the control unit 13 is caused to operate by inputting a voltage higher than the threshold voltage $V_{TH1}$ to the input terminal 4 of the transmitting unit 10 (S01). Here, being caused to operate refers to outputting a control signal. $V_{TH1}$ is taken to be a value greater than a maximum recommended voltage $V_{INH}$ of the analog input signal. In the case where a power source voltage $V_{DD1}$ applied to the power source terminal 2 is 5 V and the recommended voltage range of the analog input is ±1.5 V, $V_{TH1}$ is, for example, 2.5 V.

Here, the recommended voltage means, for example, the desirable range of the voltage swing of the analog signal input to the input terminals 4 and 6.

The threshold value $V_{TH1}$ that causes the control unit 13 to operate is not limited to the example recited above; and it is sufficient for the threshold value $V_{TH1}$ to be outside the recommended voltage range of the analog input signal. In the example described above, for example, a CMOS inverter circuit having a threshold voltage of 2.5 V may be used as the control unit 13.

The control unit 13 outputs a control signal to the switch 14 to select the reference signal (the reference signal generation unit 7) based on the voltage of the input terminal 4. The switch 14 receives the control signal from the control unit 13 and is switched to being connected to the output side $b_1$ of the reference signal generation unit 7 (S02). Thereby, the reference signal is selected as the input of the light emitting element drive unit 9. The switch 14 may include, for example, a CMOS switch circuit.

The light emitting element drive unit 9 causes the light emitting element drive current to flow in the light emitting element 15 based on the reference signal (S03). Then, the light emitting element 15 emits the optical signal $L_s$ based on the reference signal due to the drive current output from the light emitting element drive unit 9 (S04).

In the receiving unit 20, the light receiving element 17 receives the optical signal and outputs a current corresponding to the optical signal. The output current of the light receiving element 17 is converted to a voltage signal in the optical receiving unit 21 that includes, for example, a transimpedance amplifier and a comparator (S05).

The average duty ratio detection unit 23 identifies the signal based on the average duty ratio of the voltage signal and switches the switch 24a to the $d_1$ side and the switch 24b to the $d_2$ side. Thereby, the voltage signal based on the reference signal is output via the buffer 27 (S06). Then, a not-illustrated measuring device is connected to the output terminal 26 or 28; and the pulse width distortion is detected by measuring the pulse width and the pulse period of the voltage signal based on the reference signal (S07).

Although an example is described in the embodiment recited above in which the input of the AD conversion unit 3 is two terminals and the terminal of the output buffer 27 of the receiving unit 20 is two terminals, this is not limited thereto. One terminal input having a single phase may be used; or two or more terminals may be used for the input terminals and two or more terminals may be used for the output terminals. The first control unit may select one from the transmission signal and the reference signal based on the voltage of a test terminal provided separately from the input terminal. This is similar for the embodiments recited below.

Second Embodiment

Figure 2:
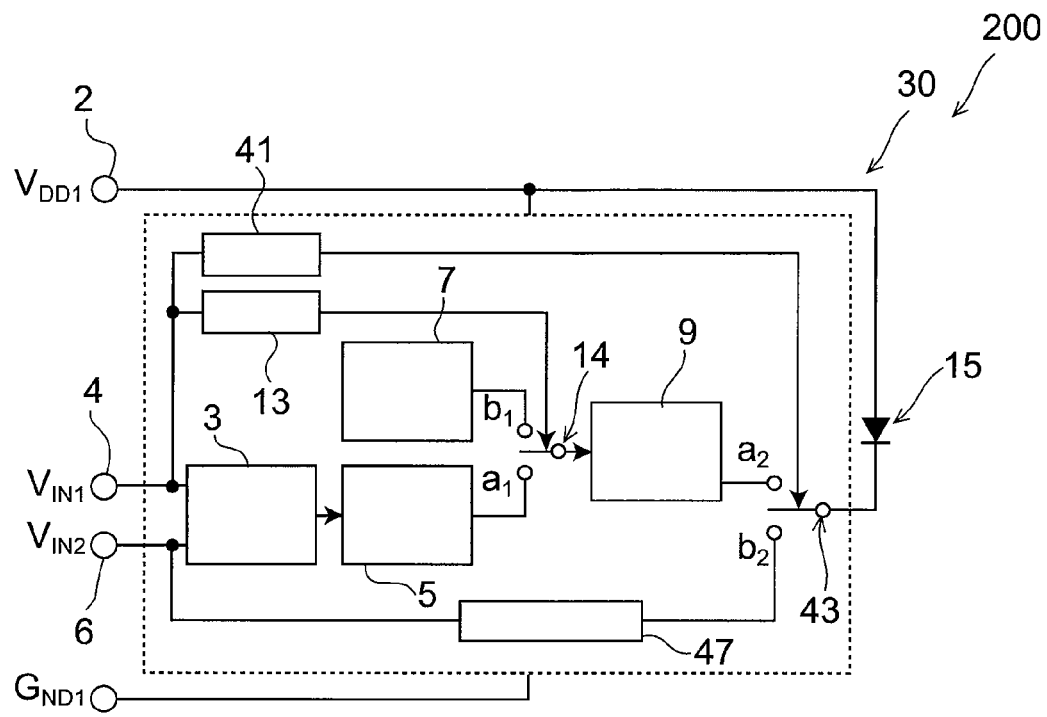
FIG. 2 is a schematic view illustrating a semiconductor device according to a second embodiment.

FIG. 2 is a schematic view illustrating the configuration of a transmitting unit 30 of a semiconductor device 200 according to a second embodiment. As illustrated in this drawing, the semiconductor device 200 differs from the semiconductor device 100 in that the semiconductor device 200 includes a current-controlled current source 47 and a third control unit 41. A not-illustrated receiving unit has the same configuration as the semiconductor device 100.

As described above, the optical coupling unit that includes the light emitting element 15 and the light receiving element 17 has a configuration to perform digital transmission. Accordingly, the evaluation of the transmission characteristics of the optical coupling unit is performed by testing whether or not the pulse pattern is in the prescribed range for the time axis and the signal strength. In the example illustrated in the first embodiment, a test of the pulse width distortion (the time axis direction) is implemented. In this embodiment, a mechanism to test the direct current sensitivity (the signal strength) is added to evaluate the signal strength.

The control unit 41 causes a drive current to flow in the light emitting element 15 by selecting one from the light emitting element drive unit 9 and the current-controlled current source 47 based on the voltage applied to the input terminal 4. The current-controlled current source 47 causes a drive current corresponding to the current applied to the input terminal 6 to flow in the light emitting element 15.

For example, when a voltage higher than a threshold voltage $V_{TH2}$ (which is greater than $V_{TH1}$) is applied to the input terminal 4, the control unit 41 connects a switch 43 to a side $b_2$ of the current-controlled current source 47. Thereby, the drive current of the light emitting element 15 flows from the power source terminal 2 into the current-controlled current source 47. On the other hand, in the case where the voltage of the input terminal 4 is lower than $V_{TH2}$, the control unit 41 sends a control signal to the switch 43 to switch the connection to a side $a_2$ of the light emitting element drive unit 9.

In the semiconductor device 200, in the case where, for example, an analog signal is input to the input terminals 4 and 6 (the transmitting mode), the control unit 13 connects the switch 14 to the $a_1$ side and the control unit 41 connects the switch 43 to the $a_2$ side. The input analog signal is converted into a transmission signal via the AD conversion unit 3 and the pulse width modulation unit 5. Then, the transmission signal input to the light emitting element drive unit 9 is superimposed onto the drive current of the light emitting element 15; and the light emitting element 15 emits the optical signal $L_s$ that includes the transmission signal.

On the other hand, in the case where a voltage that is higher than the threshold voltage $V_{TH1}$ and lower than $V_{TH2}$ is applied to the input terminal 4, the semiconductor device 200 performs the testing mode operation. At this time, the control signal is output from the control unit 13; and the connection of the switch 14 is switched to the $b_1$ side.

In such a case, the reference signal output from the reference signal generation unit 7 is conducted to the light emitting element drive unit 9; and the light emitting element 15 emits the optical signal $L_s$ based on the reference signal. Then, in the receiving unit 20 as described above, the pulse distortion can be measured by outputting the voltage signal that includes the reference signal.

In this embodiment, a control signal is output from the control unit 41 to the switch 43 when the threshold voltage $V_{TH2}$ is set to be higher than $V_{TH1}$ and the voltage of the input terminal 4 becomes higher than $V_{TH2}$. Then, the switch 43 receives the control signal from the control unit 41 and switches the connection to the side $b_2$ of the current-controlled current source 47. The current-controlled current source 47 causes a current to flow, corresponding to the input current of the input terminal 6. Accordingly, the drive current flowing in the light emitting element 15 can be controlled by the current of the input terminal 6.

By such a circuit configuration, it is possible to measure the pulse width distortion (of the optical coupling unit) between the light emitting element drive unit 9 and the optical receiving circuit 21. Also, the direct current characteristics of the light emitting element 15 (the direct current sensitivity of the optical coupling unit) can be measured. Thereby, devices having large pulse width distortion and devices for which the direct current sensitivity is outside the prescribed range can be removed at the test of the manufacturing process.

Figure 14A:
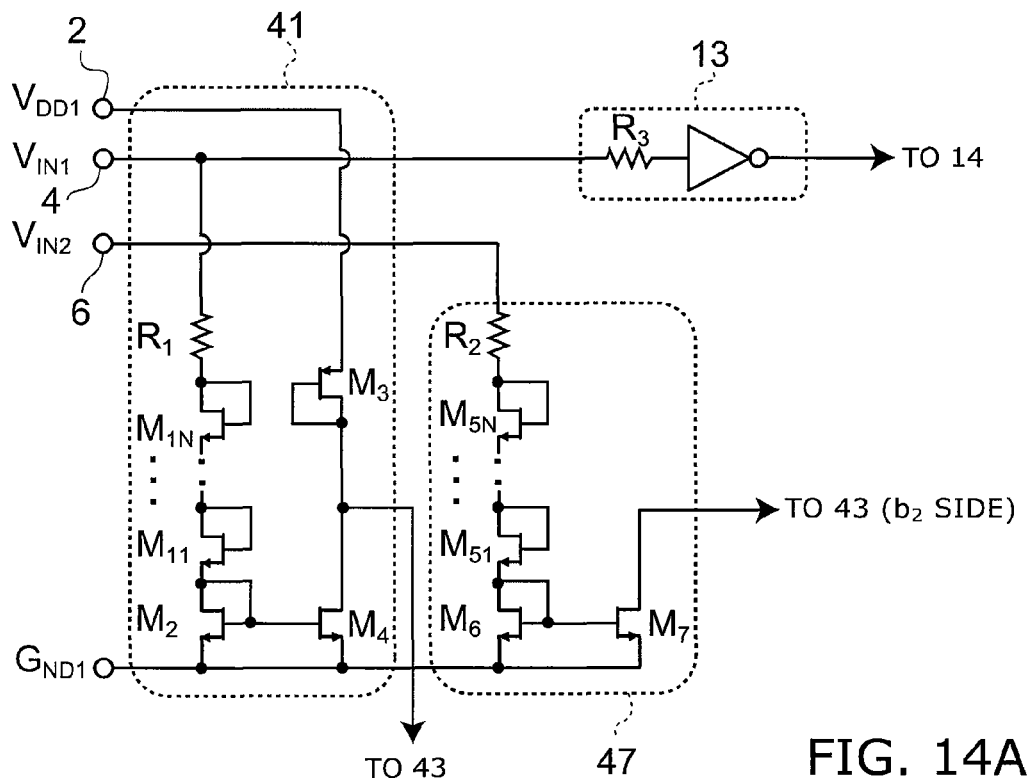
FIG. 14A and FIG. 14B are circuit diagrams illustrating control units.

The configurations of the control unit 13, the control unit 41, and the current-controlled current source 47 will now be described with reference to FIG. 14A. FIG. 14A is a circuit diagram illustrating the coupling of the power source terminal 2, the input terminals 4 and 6, the grounding terminal $G_{ND1}$, and the control units in the transmitting units 10 and 30.

The control unit 13 may include, for example, a CMOS logic circuit (as an example, an inverter circuit). A resistor $R_3$ disposed on the input side of the inverter is an ESD protection resistor and may be omitted.

The current-controlled current source 47 and the control unit 41 may include, for example, current mirror circuits. In other words, a current mirror circuit is a desirable configuration of the current-controlled current source 47 to realize the function of causing the current corresponding to the input current of the input terminal 6 to flow. On the other hand, the second control circuit 41 may include a CMOS logic circuit. However, for example, in the case where the AD conversion is to be realized with high integrity by inputting a differential signal between the input terminal 4 and the input terminal 6, it is desirable for the input impedances of the two terminals to match. Therefore, in the embodiment, a current mirror circuit is used as the control unit 41.

The operations of the control unit 41 and the current-controlled current source 47 will now be described. Here, $$V_{TH1} = V_{TH3} = V_{DD1}/2 \quad (2)$$

$$V_{TH2} = V_{TH4} = 3V_{DD1}/4 \quad (3)$$

and the recommended voltage range of the analog signal is not less than $-V_{DD1}/4$ and not more than $V_{DD1}/4$.

In the control unit 41, the NMOS transistors $M_2$ and $M_4$ have a current mirror configuration; and the threshold voltage $V_{TH2}$ is determined by $M_{11}$ to $M_{1N}$ connected in series with $M_2$. A resistor $R_1$ connected in series with $M_{11}$ to $M_{1N}$ is a current-limiting resistor.

NMOS transistors of N levels are disposed to satisfy the following formula (4) such that the control unit 41 does not operate at or less than $V_{TH2}$.

$$V_{TH2}(=3V_{DD1}/4) < V_{TH} \times N \quad (4)$$

For example, in the case where $V_{DD1}$ is 5 V and a threshold value $V_{TH}$ of the NMOS transistor is 0.8 V, not less than 5 levels (N≥5) of the NMOS transistors are disposed on the input side. Thus, a control circuit having the prescribed threshold value can be realized by setting $V_{TH2}$ by the number of levels of the MOS transistors connected in series.

In this embodiment, in the case where the voltage $V_{IN1}$ of the input terminal 4 satisfies $V_{TH1} < V_{IN1} < V_{TH2}$, only the control unit 13 operates. In the case where $V_{IN1} > V_{TH2}$, both the control unit 13 and the control unit 41 operate. In the case where $V_{IN1}$ is not more than $V_{TH1}$, the control unit 13 and the control unit 41 do not operate and the capacitance of the control unit 13 and the control unit 41 is added to the input capacitance of the AD conversion unit.

Although the input terminal 6 side of the current-controlled current source 47 also has a configuration similar to the input terminal 4, the configuration of the output side is different. In other words, the configuration differs in that the drain side of the NMOS transistor $M_7$ is connected to the light emitting element 15 via the switch 43. Accordingly, the current-controlled current source 47 operates in the case where $V_{IN2} > V_{TH4}$.

In this embodiment, the input impedance of the input terminal 4 can match the input impedance of the input terminal 6 by the configuration of the input side of the control unit 41 being the same as the configuration of the input side of the current-controlled current source 47. Thereby, the distortion of the analog signal can be suppressed; and the AD conversion and the signal transmission can be realized with high integrity.

Figure 16:
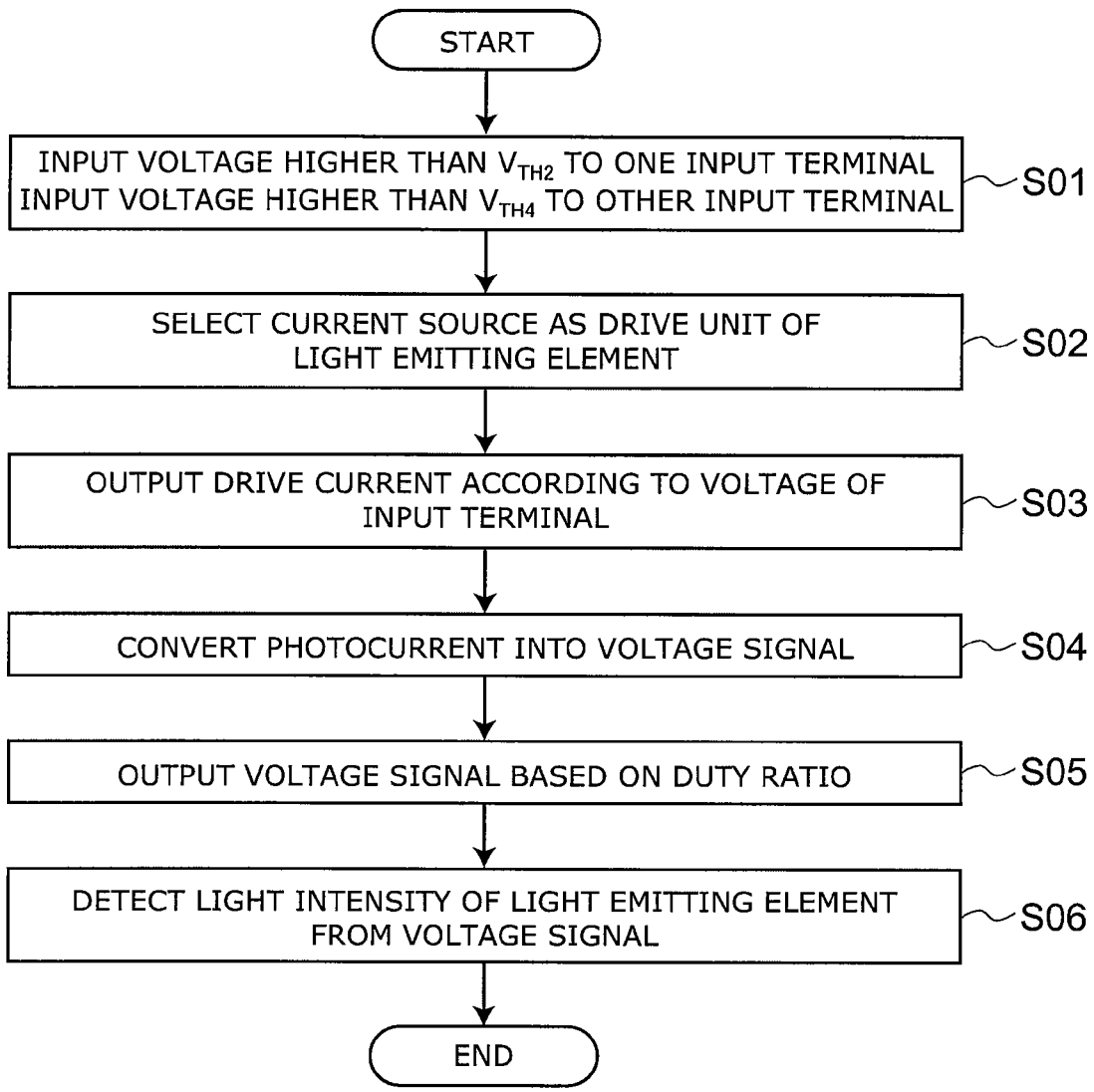
FIG. 16 is a flowchart illustrating a method for testing the semiconductor device according to the second embodiment.

A method for testing the semiconductor device 200 will now be described in detail with reference to the flowchart of FIG. 16. FIG. 16 illustrates the method for testing the direct current characteristics of the light emitting element 15.

Initially, the control unit 13 and the control unit 41 are caused to operate by inputting a voltage higher than the threshold voltage $V_{TH2}$ to the input terminal 4 of the transmitting unit 30. Simultaneously, the current-controlled current source is caused to operate by inputting a voltage higher than the threshold voltage $V_{TH4}$ to the input terminal 6 (S01). For example, in the case where the power source voltage $V_{DD1}$ applied to the power source terminal 2 is 5 V, $V_{TH2}$ and $V_{TH4}$ are 3.75 V.

The control unit 41 outputs a control signal to the switch 43 to select the current-controlled current source 47 based on the voltage of the input terminal 4. The switch 43 receiving the control signal from the control unit 41 is switched to being connected to the output side $b_2$ of the current-controlled current source 47 (S02).

In the case where the voltage of the input terminal 4 is not less than $V_{TH2}$, the input impedance of the control unit 41 decreases and current flows into the input side. Because the input impedances of the AD conversion unit 3 and the control unit 13 are high, almost the entire current flowing into the input terminal 4 flows into the input side of the control unit 41 at this time. When the current flows into the input side of the control unit 41, the current also flows into the MOS transistor $M_4$ of the output side; and the control signal is output to the switch 43.

The current-controlled current source 47 causes a drive current corresponding to the current of the input terminal 6 to flow in the light emitting element 15 (S03). In the case where a voltage higher than the threshold voltage $V_{TH2}$ is input to the input terminal 4, the control unit 13 also operates; and the switch 14 is connected to the side $b_1$ of the reference signal generation unit 7. Thereby, although the reference signal is input to the light emitting element drive unit 9, the drive current based on the reference signal does not flow in the light emitting element because the output side of the light emitting element drive unit 9 is switched to the current-controlled current source 47.

In the case of the testing mode, in the receiving unit 20, the light receiving element 17 receives the optical signal; the light receiving element 17 outputs a photocurrent corresponding to the optical signal; and the optical receiving unit 21 converts the photocurrent to a voltage signal (S04). The average duty ratio detection unit 23 identifies the operation mode based on the average duty ratio of the voltage signal, switches the switch 24a to the $d_1$ side, and switches the switch 24b to the $d_2$ side. Thereby, the voltage signal that includes the reference signal is output via the buffer 27 (S05). A not-illustrated measuring device is connected to the output terminal 26 or 28; and the light intensity of the light emitting element is detected based on the voltage level of the voltage signal (S06).

In the case where the current flowing into the input side of the current-controlled current source 47 from the input terminal 6 is a direct current, the light emitting element 15 is driven by the direct current and continuously emits light. Accordingly, the output of the optical receiving unit 21 is a voltage signal having an average duty ratio of 0% or 100% and is easily identified by the duty ratio detection unit 23. Then, the average duty ratio detection unit 23 outputs the voltage signal of the optical receiving unit 21 via the buffer 27 by connecting the switch 24a to the $d_1$ side and the switch 24b to the $d_2$ side. For example, the direct current sensitivity between the drive current of the light emitting element 15 and the output of the optical receiving unit 21 can be measured by gradually increasing the direct current flowing into the input terminal 6 and comparing the output voltage of the receiving unit 20 to the current of the input terminal 6.

Figure 3:
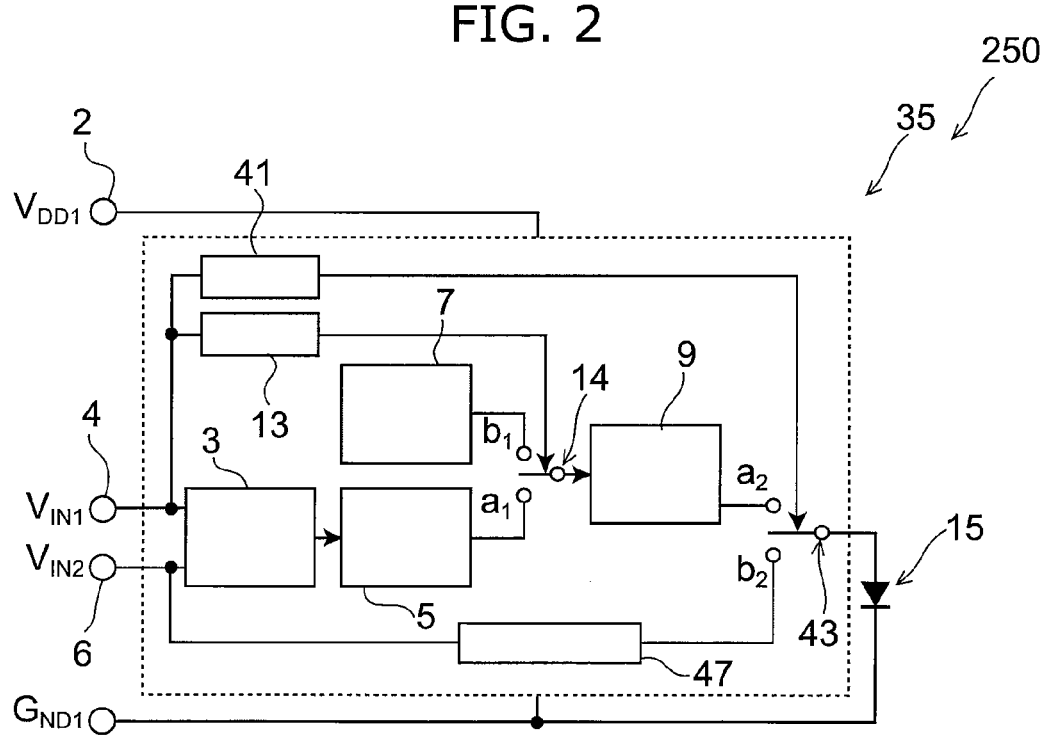
FIG. 3 is a schematic view illustrating a semiconductor device according to a variation of the second embodiment.

FIG. 3 is a schematic view illustrating the configuration of a transmitting unit 35 of a semiconductor device 250 according to a variation of the second embodiment. The semiconductor device 250 differs from the semiconductor device 200 illustrated in FIG. 2 in that the power to drive the light emitting element 15 is supplied from the light emitting element drive unit 9 and the cathode side of the light emitting element 15 is grounded. As described above, for example, it is possible to select the configuration of the semiconductor device 200 or 250 to match the polarity of the light emitting element 15 and the structure of the frame that contains the semiconductor device.

Third Embodiment

Figure 4:
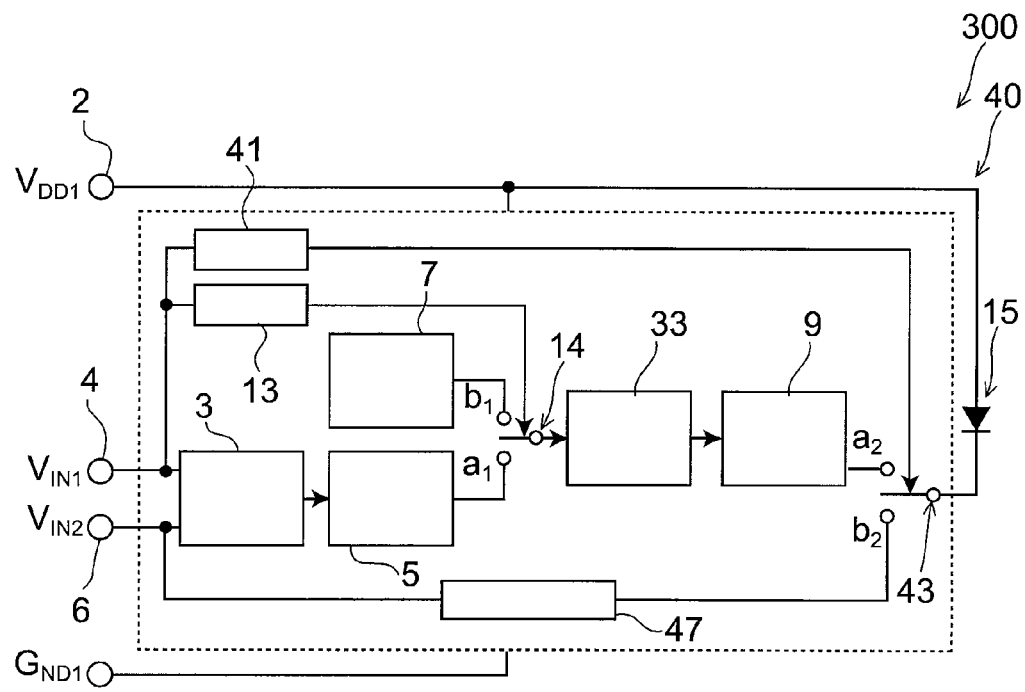
FIG. 4 is a schematic view illustrating a semiconductor device according to a third embodiment.

FIG. 4 is a schematic view illustrating the configuration of a transmitting unit 40 of a semiconductor device 300 according to a third embodiment. As illustrated in this drawing, the semiconductor device 300 differs from the semiconductor device 200 in that the semiconductor device 300 includes a distortion compensation unit 33 between the switch 14 and the light emitting element drive unit 9. In this embodiment as well, the receiving unit has the same configuration as the receiving unit 20 of the semiconductor device 100.

The distortion compensation unit 33 is disposed between the light emitting element drive unit 9 and the switch 14 which is controlled by the control unit 13; and the distortion compensation unit 33 compensates the pulse widths of the transmission signal output from the pulse width modulation unit 5 and the reference signal output from the reference signal generation unit 7. Thereby, good signal transmission can be realized even in the case where a light emitting element having a relatively large equivalent capacitance is used and even with operating conditions in which the drive current of the light emitting element is small.

For example, in the case where a light emitting diode (LED) is used as the light emitting element 15, a time delay occurs from when the drive current starts to flow to when the prescribed light emission intensity is reached. This time delay is shorter than the time from when the drive current is stopped to when the light of the light emitting element 15 is extinguished. Therefore, in the case where the light emitting element 15 is caused to emit light by the drive current of a pulse signal, there is a tendency for the pulse width of the optical signal $L_s$ emitted from the light emitting element 15 to be shorter than the pulse width of the drive current.

The decrease of the pulse width becomes pronounced as the equivalent capacitance of the light emitting element 15 increases or as the drive current of the light emitting element 15 decreases. In other words, there are cases where an exceedingly large decrease of the pulse width (pulse width distortion) that is dependent on the characteristics of the light emitting element 15 and the size of the drive current occurs and error-free demodulation is impossible in the demodulation unit 25 on the receiving side.

Therefore, in this embodiment as recited above, the pulse width distortion of the decrease in the electricity-light conversion process of the light emitting element 15 is compensated by the pulse width of the transmission signal being widened beforehand in the distortion compensation unit 33 disposed between the pulse width modulation unit 5 and the light emitting element drive unit 9.

Figure 5:
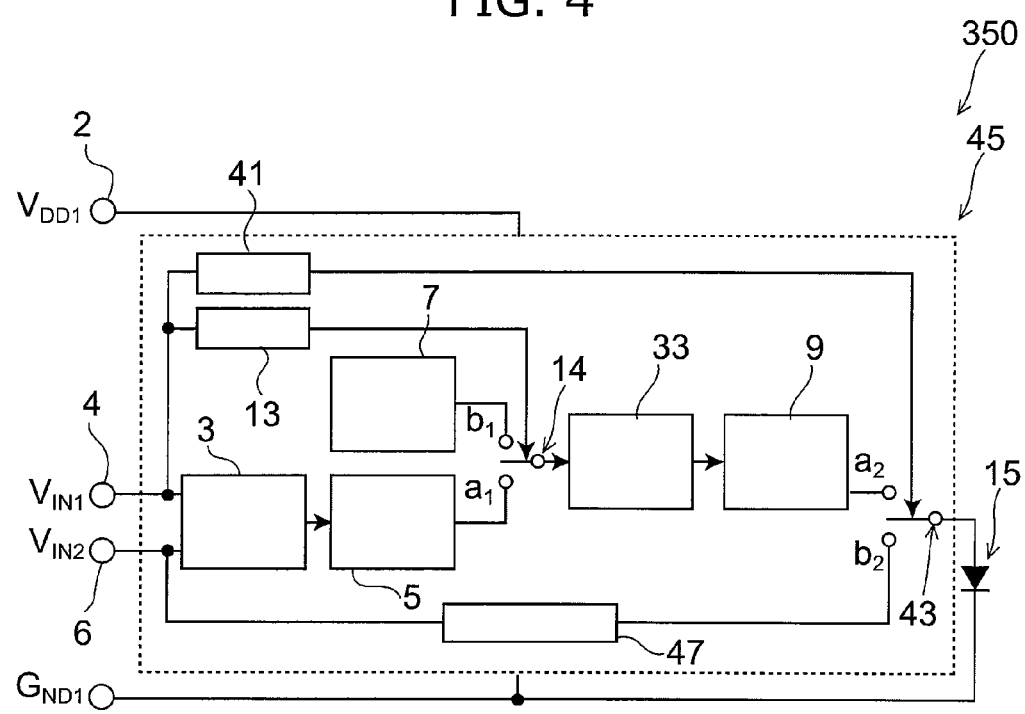
FIG. 5 is a schematic view illustrating a semiconductor device according to a variation of the third embodiment.

FIG. 5 is a schematic view illustrating the configuration of a transmitting unit 45 of a semiconductor device 350 according to a variation of the third embodiment. The semiconductor device 350 differs from the semiconductor device 300 illustrated in FIG. 4 in that the cathode side of the light emitting element 15 is grounded and the power to drive the light emitting element 15 is supplied from the light emitting element drive unit 9 or the current-controlled current source 47 that is selected by the control unit 41.

In this variation, the drive current is supplied from the output side of the current-controlled current source 47 to the light emitting element 15. Accordingly, for example, the current-controlled current source 47 may include a circuit that uses PMOS transistors to reverse the polarities of the MOS transistors.

Fourth Embodiment

Figure 6:
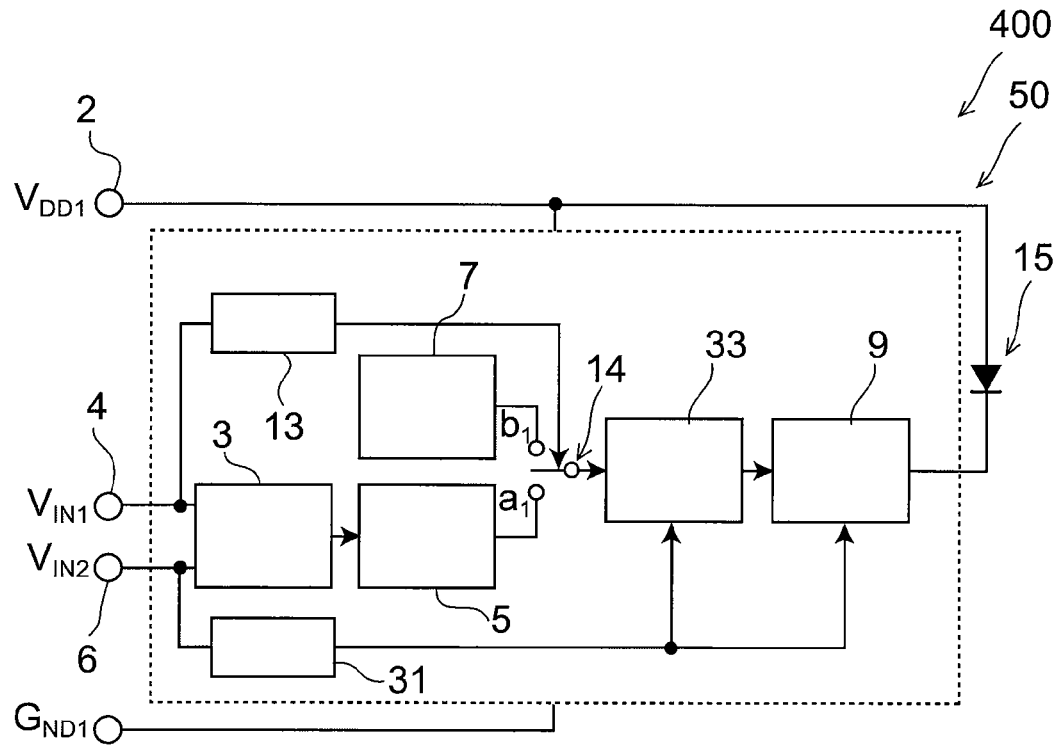
FIG. 6 is a schematic view illustrating a semiconductor device according to a fourth embodiment.

FIG. 6 is a schematic view illustrating the configuration of a transmitting unit 50 of a semiconductor device 400 according to a fourth embodiment. As illustrated in this drawing, the semiconductor device 400 differs from the semiconductor device 100 in that the semiconductor device 400 includes the distortion compensation unit 33 and a second control unit 31. A not-illustrated receiving unit has the same configuration as the receiving unit 20 of the semiconductor device 100. Also, this embodiment differs from the semiconductor devices 200 to 350 illustrated in the second and third embodiments in that the current-controlled current source 47 is not included.

As described above, the distortion compensation unit 33 compensates the pulse widths of the transmission signal output from the pulse width modulation unit 5 and the reference signal output from the reference signal generation unit 7. In this embodiment, the control unit 31 is provided to control the distortion compensation unit 33 and the light emitting element drive unit 9 based on the level of the signal input to the input terminal 6.

Figure 14B:
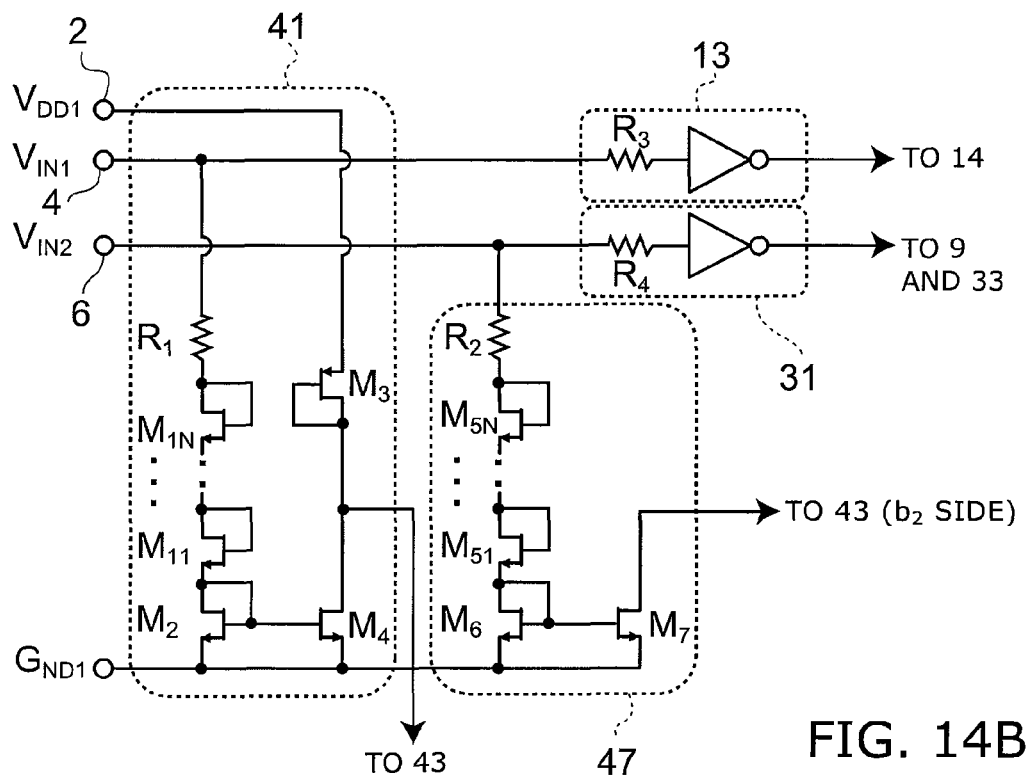

For example, FIG. 14B is a circuit diagram illustrating the configuration of the control circuits of this embodiment in which the control circuit 31 is added to the circuit diagram of FIG. 14A. The control unit 31 outputs a control signal to the distortion compensation unit 33 and causes the compensation amount that is added to the pulse width of the transmission signal or the reference signal to change. The control unit 31 outputs the control signal also to the light emitting element drive unit 9 and causes the drive current of the light emitting element 15 to change. The control unit 31 may include, for example, a CMOS inverter. Although a protection resistor $R_4$ is disposed on the input side of the inverter in this drawing, the protection resistor $R_4$ may be omitted.

For example, the drive current output from the light emitting element drive unit 9 is set to have a constant current value that matches the light emitting element 15. Conversely, for example, in the case where a voltage higher than the threshold voltage $V_{TH3}$ is applied to the input terminal 6, the control unit 31 outputs the control signal to the light emitting element drive unit 9; and the drive current is controlled to have a value smaller than the set current value. Thereby, it is possible to imitate the state in which the luminous efficiency decreases due to degradation of the light emitting element 15 over time and to measure the pulse width distortion or the pulse period in this state.

As described above, the pulse width distortion due to the response delay of the light emitting element increases as the current flowing in the light emitting element is simply reduced. Therefore, the control unit 31 simultaneously controls the distortion compensation unit 33 to increase the compensation amount of the pulse width for the signal input to the light emitting element drive unit 9. Thereby, because it is possible to correct the pulse width distortion that occurs as the drive current of the light emitting element changes, the degradation over time in which the light intensity decreases can be imitated; and the pulse distortion of this state can be measured.

Figure 13A:
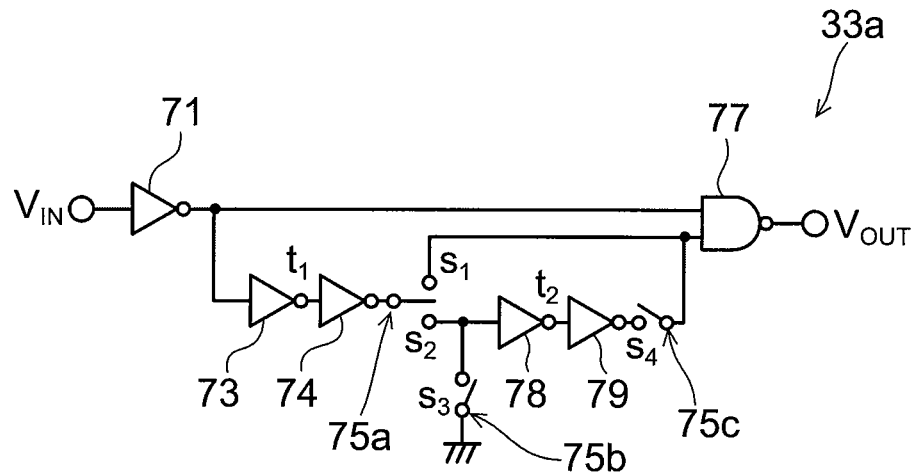
FIG. 13A and FIG. 13B are circuit diagrams illustrating distortion compensation units.
Figure 13B:
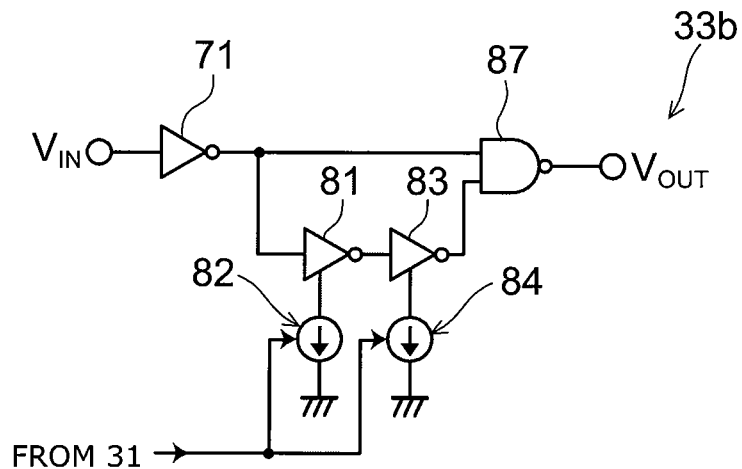

The configuration of the distortion compensation unit 33 will now be described with reference to FIGS. 13A and 13B. FIG. 13A and FIG. 13B are circuit diagrams illustrating distortion compensation units 33 of different control methods.

In the circuit illustrated in FIG. 13A, the pulse signal inverted by an inverter 71 and a delay signal generated by delaying the pulse signal are input to a NAND 77; and the NAND 77 outputs a signal having a pulse width that is widened by the amount of the delay. For example, in the transmitting mode, a switch 75a is connected to a $s_1$ side; a switch 75b is shorted; and a switch 75c is opened. In such a case, the NAND 77 outputs a pulse signal in which a delay time $t_1$ of inverters 73 and 74 is compensated (added) to the input pulse signal. For example, as described above, $D_{tp}<0$, where $D_{tp}$ is the pulse width distortion of the optical signal $L_s$ emitted from the light emitting element 15 (calculated by the time for the light of the light emitting element to be extinguished minus the time for the light to be emitted). Accordingly, the pulse width distortion of the optical signal $L_s$ can be canceled if the delay time $t_1$ is set to be equal to $-D_{tp}$.

For example, when a voltage higher than the threshold voltage $V_{TH3}$ is applied to the input terminal 6, the control unit 31 outputs the control signal to the distortion compensation unit 33. Then, in the distortion compensation unit 33, the switch 75a is switched to a $s_2$ side; the switch 75b is opened; and the switch 75c is shorted. Thereby, a delay time $t_2$ of inverters 78 and 79 is added to the pulse input to the NAND 77.

For example, in the case where the degradation of the light emitting element 15 over time is imitated, the control signal is output also to the light emitting element drive unit 9 simultaneously with the distortion compensation unit 33 to reduce the drive current of the light emitting element 15. Then, if the reduction amount of the pulse width caused by reducing the drive current is the same as the delay time $t_2$ that is newly added, the optical signal that is emitted has a reduced strength and a pulse width of the case where the drive current is not reduced. Thereby, it is possible to imitate the state in which degradation of the light emitting element 15 occurs over time.

In the circuit illustrated in FIG. 13B, the delay time of the delay signal input to a NAND 87 is controlled by the currents of inverters 81 and 83. For example, in the case where the inverters 81 and 83 include CMOS inverters, the delay time lengthens as the shoot-through currents flowing in the inverters are reduced; and the delay time shortens as the currents are increased.

As illustrated in FIG. 13B, current sources 82 and 84 that are respectively connected to the inverters 81 and 83 are controlled by the control unit 31 to control the delay time of the inverters 81 and 83. For example, it is conceivable to provide multiple constant current circuits having different current outputs in parallel as the current source 82 and to use a method in which the current source is switched by the control signal output from the control unit 31. Thereby, operations equivalent to those of the distortion compensation circuit illustrated in FIG. 13A can be realized.

In the semiconductor device according to this embodiment as well, the components enclosed with the broken line in FIG. 6 can be integrated into one semiconductor chip. In other words, the transmitting unit 50 may include an integrated circuit (a transmitting IC) that includes the input terminals 4 and 6, the AD conversion circuit 3, the pulse width modulation circuit 5, the reference signal generation circuit 7, the light emitting element drive circuit 9, the control circuit 13, the switch circuit 14 controlled by the control circuit 13, the distortion compensation circuit 33, and the third control circuit 31 configured to control the distortion compensation circuit 33 and the light emitting element drive circuit 9.

Figure 17:
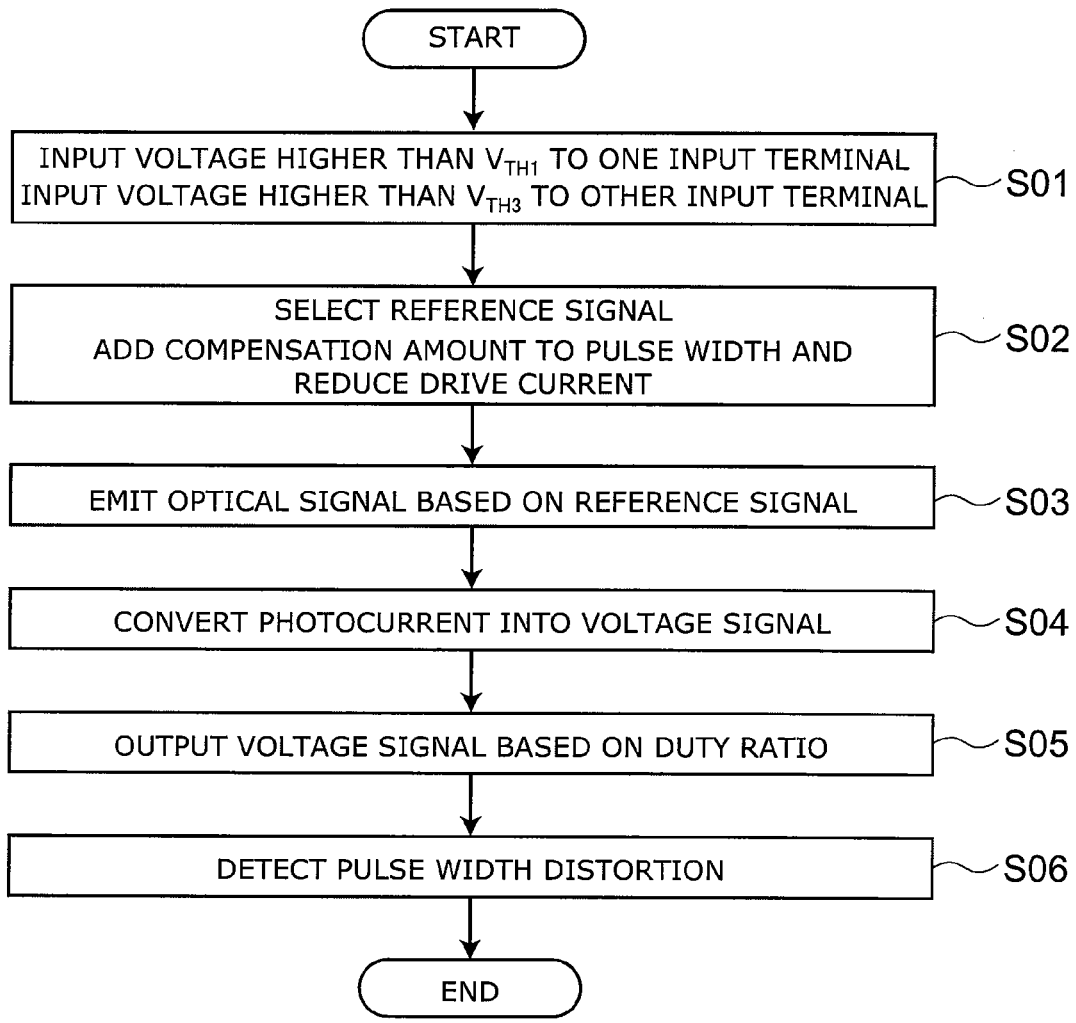
FIG. 17 is a flowchart illustrating a method for testing the semiconductor device according to the fourth and the fifth embodiments.

A method for testing the semiconductor device 400 will now be described in detail with reference to the flowchart of FIG. 17. FIG. 17 illustrates the method for testing the pulse distortion in the case where the degradation of the light emitting element 15 over time is imitated.

Initially, the control unit 13 is caused to operate by inputting a voltage higher than the threshold voltage $V_{TH1}$ to the input terminal 4 of the transmitting unit 50. Simultaneously, the control unit 31 is caused to operate by inputting a voltage higher than the threshold voltage $V_{TH3}$ to the input terminal 6 (S01).

Here, $V_{TH1}$ and $V_{TH3}$ are taken to be values greater than the maximum value $V_{INH}$ of the recommended voltage of the analog signal. For example, in the case where the power source voltage $V_{DD1}$ applied to the power source terminal 2 is 5 V, the recommended voltage range of the analog input is $\pm 1.25$ V and $V_{TH1}$ is 2.5 V. This is not limited to the example recited above; and it is sufficient for $V_{TH1}$ and $V_{TH3}$ to be outside the voltage range of the analog signal.

The control unit 13 outputs a control signal to the switch 14 to select the reference signal (the reference signal generation unit 7) based on the voltage of the input terminal 4. The switch 14 receiving the control signal from the control unit 13 is switched to being connected to the output side $b_1$ of the reference signal generation unit 7. Thereby, the reference signal is selected as the input of the light emitting element drive unit 9 (S02).

The control unit 31 outputs a control signal to the distortion compensation unit 33 and the light emitting element drive unit 9 based on the voltage of the input terminal 6. The distortion compensation unit 33 adds the prescribed compensation amount $(t_1+t_2)$ to compensate the pulse width of the reference signal. The light emitting element drive unit 9 reduces the level of the drive current and outputs the reference signal having the compensated pulse width (S02). Then, the optical signal $L_s$ based on the reference signal is emitted from the light emitting element 15 by the drive current output from the light emitting element drive unit 9 (S03).

In the receiving unit 20, the light receiving element 17 receives the optical signal and outputs a photocurrent corresponding to the optical signal. The optical receiving unit 21 converts the photocurrent into a voltage signal that includes the reference signal (S04).

The average duty ratio detection unit 23 identifies the signal based on the average duty ratio of the voltage signal and switches the switch 24a to the $d_1$ side and the switch 24b to the $d_2$ side. Thereby, the voltage signal based on the reference signal is output via the buffer 27 (S05). Then, a not-illustrated measuring device is connected to the output terminal 26 or 28; and the pulse width distortion is detected by measuring the pulse width of the voltage signal that includes the reference signal (S06).

Figure 7:
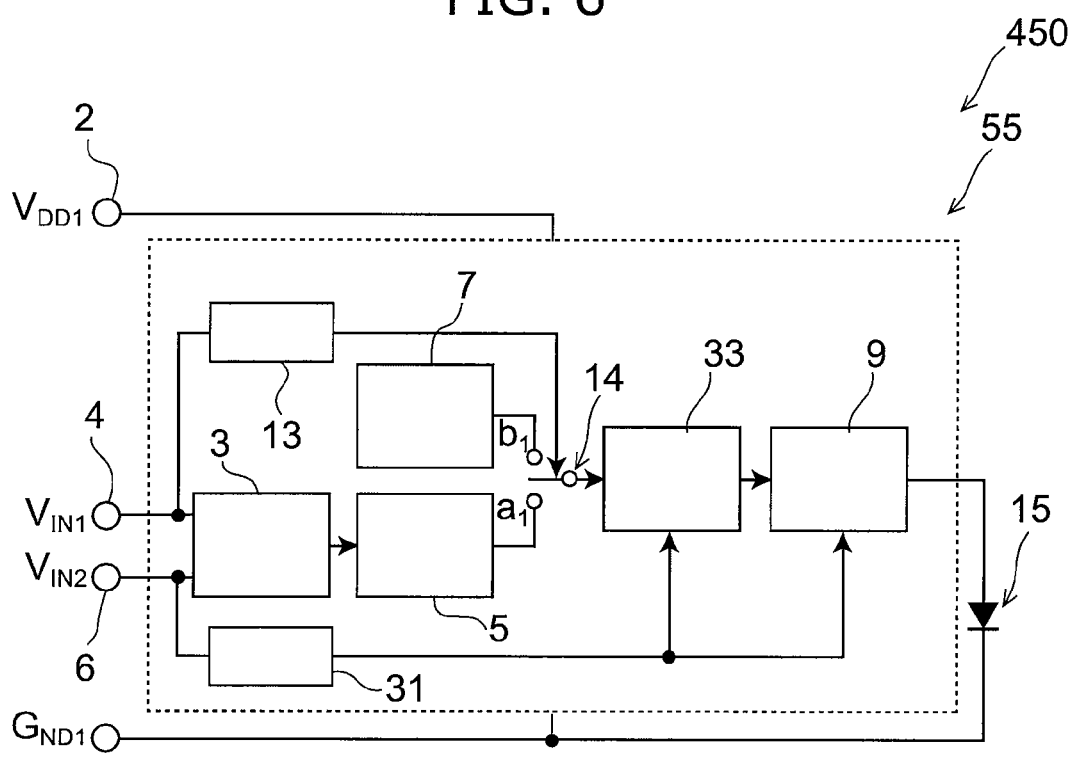
FIG. 7 is a schematic view illustrating a semiconductor device according to a variation of the fourth embodiment.

FIG. 7 is a schematic view illustrating the configuration of a transmitting unit 55 of a semiconductor device 450 according to a variation of the fourth embodiment. The semiconductor device 450 differs from the semiconductor device 400 illustrated in FIG. 6 in that the cathode side of the light emitting element 15 is grounded and the current to drive the light emitting element 15 is supplied from the light emitting element drive unit 9.

For example, it is possible to select the configuration of the semiconductor device 400 or 450 to match the polarity of the light emitting element 15 and the structure of the frame that contains the semiconductor device. Thereby, simplification of the circuit configuration and downsizing of the device size can be realized.

As recited above, the semiconductor devices 400 and 450 according to this embodiment have configurations that measure the pulse distortion and do not include the measurement mechanism of the direct current sensitivity. On the other hand, the semiconductor devices 200 to 350 according to the second and third embodiments test the direct current sensitivity and the pulse width distortion of the optical coupling unit.

In other words, in the semiconductor devices 200 to 350, the optical receiving unit 21 can receive direct current signals to high frequency band signals. Therefore, both the direct current sensitivity and the pulse width distortion are evaluated. Conversely, for example, in the case where the average duty ratio of the optical signal $L_s$ is constant, there are cases where it is sufficient for the optical receiving unit 21 to amplify the signal between the lower cut-off frequency and the upper cut-off frequency. In such a case, an AC-coupled configuration may be used in which the components of the optical receiving unit 21 are connected with capacitances. However, in an AC-coupled optical receiving unit, the direct current sensitivity cannot be directly measured. Accordingly, the configurations of the semiconductor devices 400 and 450 illustrated in this embodiment are suitable.

Incidentally, an automatic threshold control circuit (ATC circuit, not-illustrated) is often provided in the semiconductor devices 200 to 350 to suppress the pulse width distortion of the optical receiving unit 21. Conversely, the AC-coupled optical receiving circuit has the advantage that the circuit configuration can be simplified because the ATC circuit is unnecessary.

Fifth Embodiment

Figure 8:
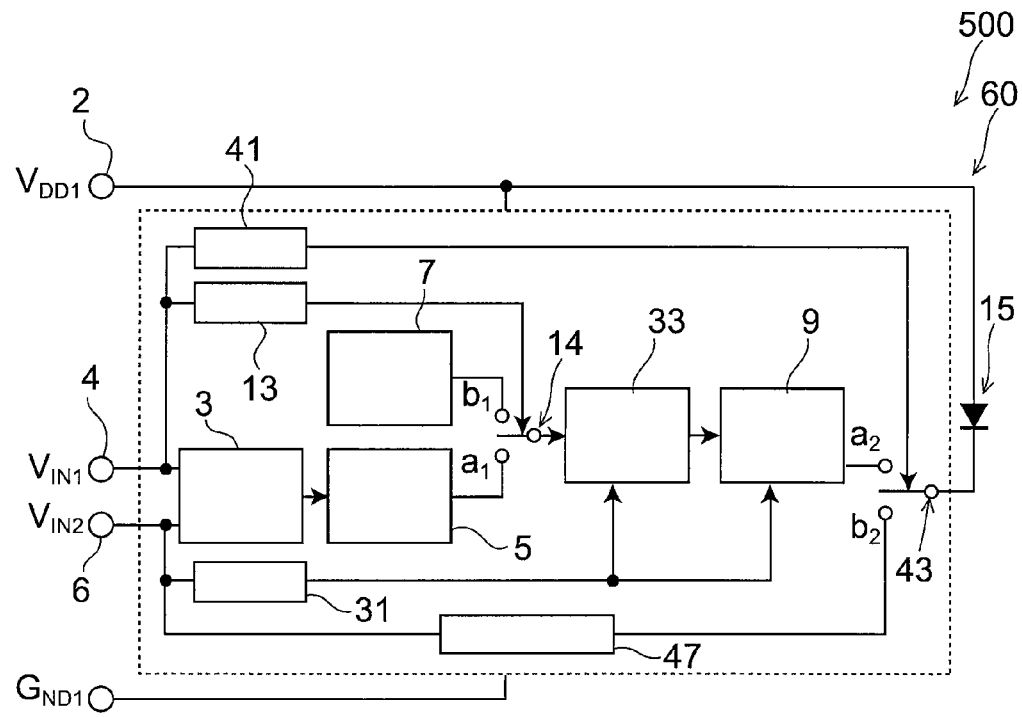
FIG. 8 is a schematic view illustrating a semiconductor device according to a fifth embodiment.

FIG. 8 is a schematic view illustrating the configuration of a transmitting unit 60 of a semiconductor device 500 according to a fifth embodiment. As illustrated in this drawing, the transmitting unit 60 of the semiconductor device 500 has a configuration in which the second control unit 31 is added to the transmitting unit 40 of the semiconductor device 300.

In the semiconductor device 300 as described above, the pulse width distortion of the optical coupling unit and the direct current sensitivity of the light emitting element 15 can be measured. However, it is not enough to use only these measurements for the test of the optical coupling unit. For example, in the case where the test specification is defined to anticipate the decrease of the luminous efficiency due to the change of the light emitting element 15 over time, although it is possible to detect the change of the direct current sensitivity, it is impossible to sort devices for which the pulse width distortion has become large due to changes over time.

Therefore, in this embodiment, the control unit 31 is added; and a test that anticipates the change of the light emitting element 15 over time is possible. Thereby, more rigorous detection of the transmission margin of the optical coupling unit is possible; and signal transmission can be realized with high integrity.

In the semiconductor device 500, the control unit 31 operates in the case where the voltage $V_{IN2}$ of the input terminal 6 is not less than $V_{TH3}$ and not more than $V_{TH4}$. The input impedance (the number of levels of the MOS transistor) of the current-controlled current source 47 is set such that current does not flow into the input side of the current-controlled current source 47 at this time. Because the input of the AD conversion unit 3 also has high impedance, current does not flow into the input terminal 6 when the voltage of the input terminal 6 is within the range recited above.

When the voltage $V_{IN2}$ of the input terminal 6 is increased to be not less than $V_{TH4}$, current starts to flow into the input side of the current-controlled current source 47. At this time, if the input of the AD conversion unit 3 and the input of the control unit 31 have high impedances, almost the entire current flowing into the input terminal 6 flows into the input side of the current-controlled current source 47. Accordingly, the light emitting element can be driven by a current that is proportional to $V_{IN2}$ by changing the current flowing into the input terminal 6 by changing $V_{IN2}$ within a range that is not less than $V_{TH4}$.

FIG. 18 is a table illustrating an example of the bias states of the input terminals 4 and 6 and the operation modes corresponding to the bias states for the semiconductor device 500. For example, although the nine operation modes of I to IX for the bias states of the input terminals are envisaged, the three operation modes of VI to VIII are operating states that are not intended and their use is not envisaged.

In the first operation mode (I), an analog signal is input to the input terminals 4 and 6; and the digital data signal and the clock signal are output to the receiving side. The second to ninth operation modes (II to the IX) are testing modes in which the measurement of the pulse width distortion (II), the pulse width distortion of the degradation over time (V), and the direct current sensitivity (IX) can be implemented.

Figure 9:
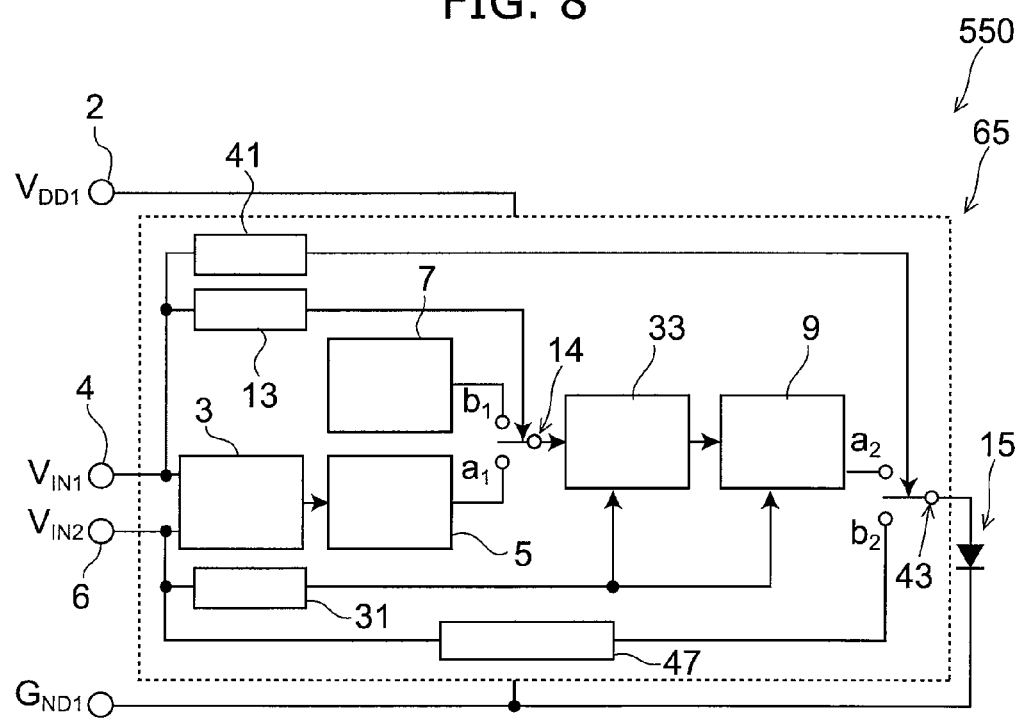
FIG. 9 is a schematic view illustrating a semiconductor device according to a variation of the fifth embodiment.

FIG. 9 is a schematic view illustrating the configuration of a transmitting unit 65 of a semiconductor device 550 according to a variation of the fifth embodiment. The semiconductor device 550 differs from the semiconductor device 500 illustrated in FIG. 8 in that the cathode side of the light emitting element 15 is grounded and the power to drive the light emitting element 15 is supplied from the light emitting element drive unit 9 or the current-controlled current source 47. As described above, it is possible to appropriately select the configuration of the semiconductor device 500 or 550 according to the polarity of the light emitting element 15 and the structure of the frame.

In the embodiment recited above, control signals are output from the control unit 13 and the control unit 41 based on the voltage of the input terminal 4; and based on the voltage of the input terminal 6, a control signal is output from the control unit 31 and the current-controlled current source 47 controls the drive current. This combination is arbitrary. Configurations may be used in which the operations of the control units and the current-controlled current source 47 are based on the voltage of any input terminal selected from the multiple input terminals. In such a case, to prevent misoperations, it is favorable for not more than two threshold voltages to be set for one input terminal.

Sixth Embodiment

Figure 10:
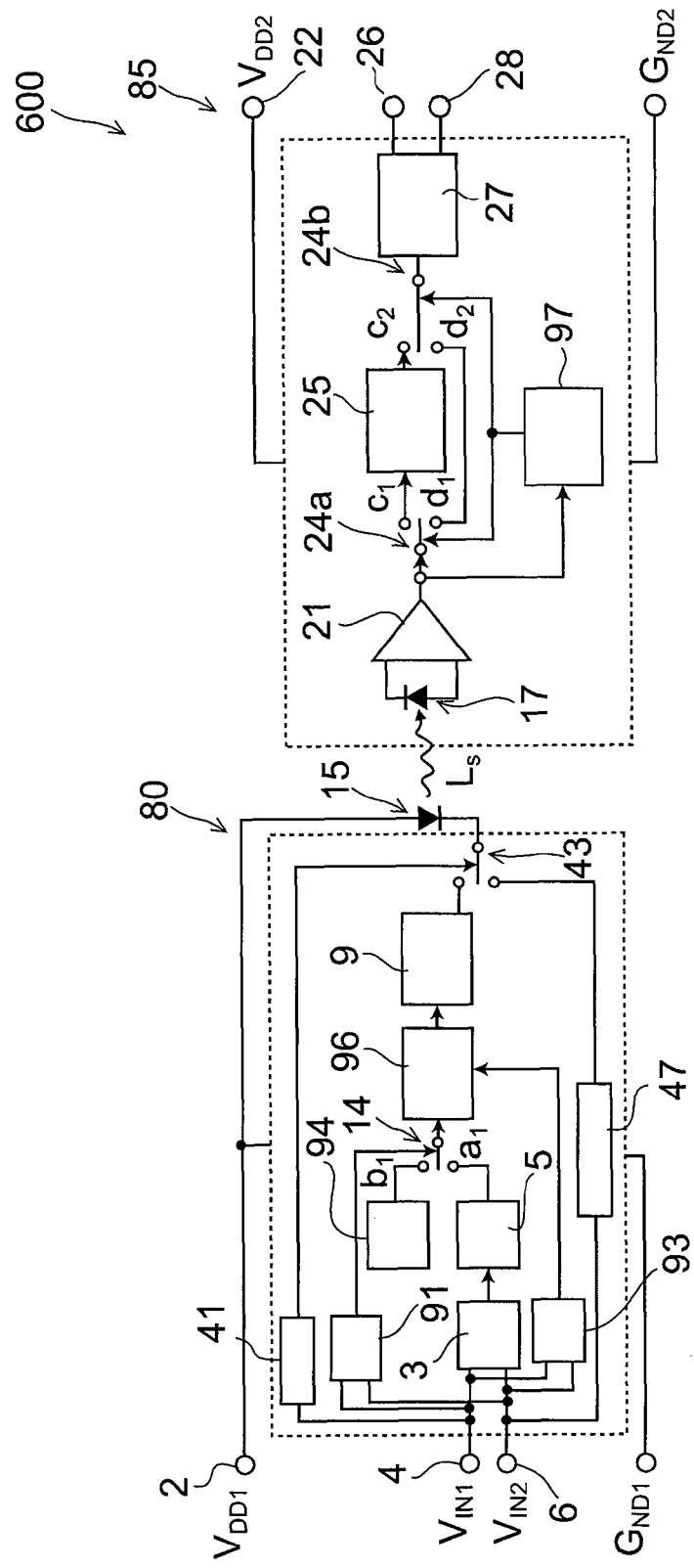
FIG. 10 is a schematic view illustrating a semiconductor device according to a sixth embodiment.

FIG. 10 is a schematic view illustrating a transmitting unit 80 and a receiving unit 85 of a semiconductor device 600 according to a sixth embodiment. As illustrated in this drawing, the semiconductor device 600 differs from the semiconductor device 500 in that the semiconductor device 600 includes a first control unit 91 configured to control the switch 14 and a second control unit 93 configured to control a distortion compensation unit 96.

The semiconductor device 600 has a configuration to evaluate the transmission margin by detecting the decoding error. Therefore, pulse patterns having, for example, duties of 25% and 75% are alternately output from a reference signal generation unit 94 of the transmitting unit 80. In other words, the pulses of pattern B and pattern C illustrated in FIG. 12 are alternately output; and a reference signal is output to imitate the state in which the entire ADC output is "H." As another example, a pulse of pattern A having a duty of 50% may be output; and the reference signal may imitate the state in which the entire ADC output is "L."

The control unit 91 controls the switch 14 based on the voltages of the input terminals 4 and 6. For example, in the case where the voltage $V_{IN1}$ of the input terminal 4 is higher than $V_{TH1}$ and lower than $V_{TH2}$ and the voltage $V_{IN2}$ of the input terminal 6 is lower than $V_{TH3}$, the switch 14 is connected to the $b_1$ side and the reference signal is input to the distortion compensation unit 96. On the other hand, in the case where the voltage $V_{IN1}$ of the input terminal 4 is lower than $V_{TH1}$ and the voltage $V_{IN2}$ of the input terminal 6 is lower than $V_{TH3}$, the switch 14 is connected to the $a_1$ side and the transmission signal is input to the distortion compensation unit 96.

The control unit 93 controls the distortion compensation unit 96 based on the voltages of the input terminals 4 and 6. In the distortion compensation unit 96 according to this embodiment, the three types of the delay times $t_1$, $t_2$, and $t_3$ are added. For example, $t_1 < t_2 < t_3$; and the delay time $t_2$ is the delay time that appropriately compensates the pulse distortion of the light emitting element of the optical signal L. Such a control of the delay time can be easily realized using the circuit example illustrated in FIG. 13B. This is also possible using a configuration in which a new inverter and switch are added to the circuit example of FIG. 13A.

For example, in the case where the voltage $V_{IN1}$ of the input terminal 4 is higher than $V_{TH1}$ and lower than $V_{TH2}$ and the voltage $V_{IN2}$ of the input terminal 6 is lower than $V_{TH3}$, the control unit 93 adds the delay time $t_3$. In the case where the voltage $V_{IN1}$ of the input terminal 4 is higher than $V_{TH1}$ and lower than $V_{TH2}$ and the voltage $V_{IN2}$ of the input terminal 6 is higher than $V_{TH3}$ and lower than $V_{TH4}$, the delay time $t_1$ is added. In other words, the compensation amount of the pulse width of the reference signal is controlled based on the voltage of the input terminal 6.

On the other hand, in the receiving unit 85, the light receiving element 17 detects the optical signal $L_s$ that is based on the reference signal; and the optical receiving unit 21 converts the optical signal $L_s$ into a voltage signal. For example, in this embodiment, an average duty ratio detection unit 97 connects the switches 24a and 24b to the $d_1$ and $d_2$ sides in the measuring mode of the direct current sensitivity in which the current-controlled current source 47 operates. In other words, when the average duty ratio is 0% or 100%, the voltage signal is output via the buffer 27. Accordingly, the voltage signal based on the reference signal is decoded into a digital signal by the demodulation unit 25.

For example, it may be assumed that distortion occurs in the direction in which the pulse width widens and the margin $\Delta T_{M1}$ illustrated in FIG. 12 is small. In such a case, when the reference signal that is demodulated imitates the state in which the pulse width widens by the delay time $t_3$ being added and the entire reference signal is "H," the pulse having the duty of 25% for the identification points should be "H" at $T_1$, "L" at $T_2$, and "L" at $T_3$ but is determined to be "H" at $T_1$, "H" at $T_2$, and "L" at $T_3$; and "L" is mixed into the signal that is output. Conversely, it may be assumed that distortion occurs in the direction in which the pulse width becomes narrow and the margin $\Delta T_{M2}$ is small. In such a case, when the delay time $t_1$ that is insufficient as the compensation amount is added, the pulse having the duty of 75% for the identification points should be "H" at $T_1$, "H" at $T_2$, and "H" at $T_3$ but is determined to be "H" at $T_1$, "H" at $T_2$, and "L" at $T_3$; and "L" is mixed into the signal that is output. Thus, semiconductor devices having small margins $\Delta T_{M1}$ or $\Delta T_{M2}$ can be sorted by detecting the decoded reference signal.

Because it is sufficient only to identify the existence or absence of "L" in the measurement method recited above, this measurement method is advantageous regarding the measurement time and the ease of measurement. Even in the case of a signal that imitates the entire reference signal being "L," similar measurements are possible.

Seventh Embodiment

Figure 11:
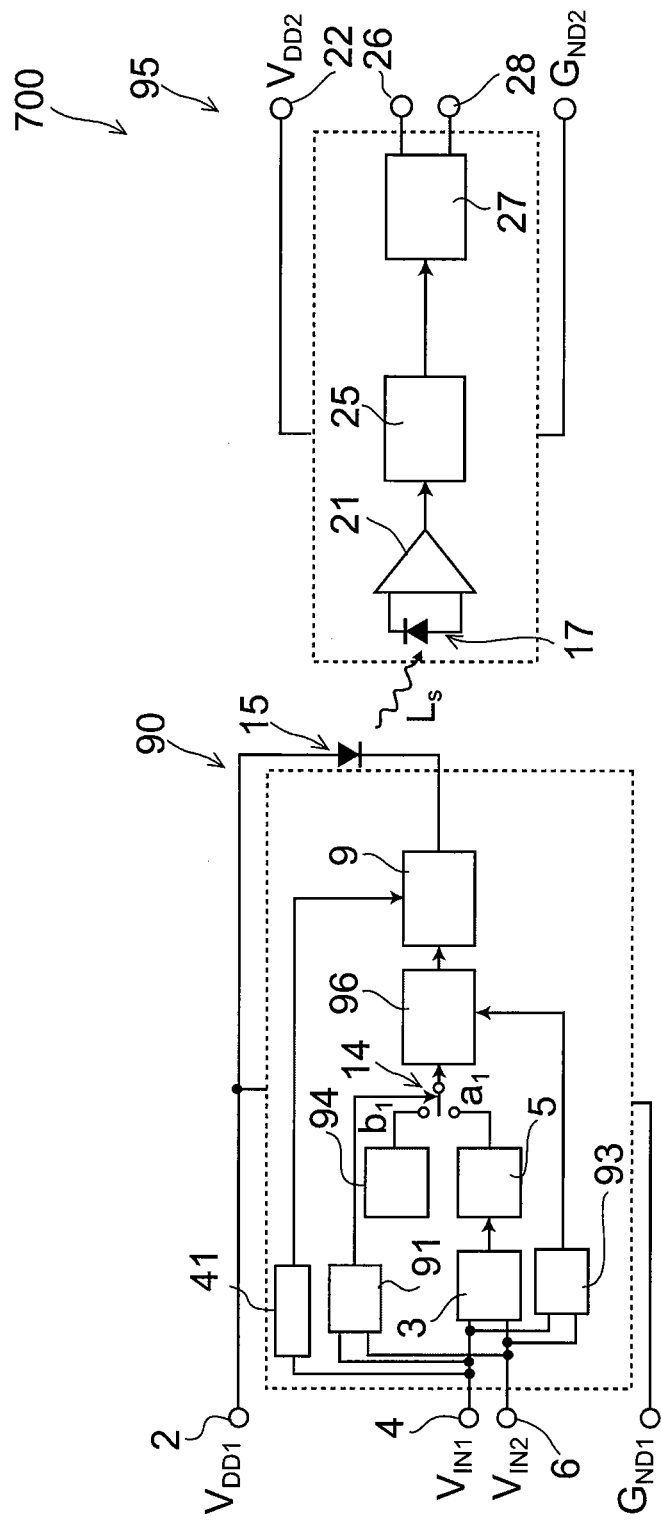
FIG. 11 is a schematic view illustrating a semiconductor device according to a seventh embodiment.

FIG. 11 is a schematic view illustrating a transmitting unit 90 and a receiving unit 95 of a semiconductor device 700 according to a seventh embodiment. As illustrated in this drawing, the transmitting unit 90 of the semiconductor device 700 differs from the transmitting unit 80 of the semiconductor device 600 in that the transmitting unit 90 does not include the current-controlled current source 47 and the switch 43. Further, the receiving unit 95 differs from the receiving units 20 and 85 in that the receiving unit 95 does not include the average duty ratio detection unit 23 and the switches 24a and 24b.

This embodiment is suited to a configuration including an AC-coupled optical receiving circuit that does not directly measure the direct current sensitivity. Similarly to the sixth embodiment described above, the distortion compensation unit 96 and the control unit 91 configured to control the switch 14 are included. The control unit 41 controls the light emitting element drive unit 9.

The reference signal generation unit 94 outputs a reference signal that imitates the state in which the entire ADC output is "H." Or, a reference signal that imitates the state in which the entire ADC output is "L" may be used by outputting the pulse of pattern A having the duty of 50%. As described above, the distortion compensation unit 96 adds the three types of the delay times $t_1$, $t_2$, and $t_3$.

For example, in the case where the voltage $V_{IN1}$ of the input terminal 4 is higher than $V_{TH1}$ and lower than $V_{TH2}$ and the voltage $V_{IN2}$ of the input terminal 6 is lower than $V_{TH3}$, the control unit 91 connects the switch 14 to the $b_1$ side; and the reference signal is input to the distortion compensation unit 96. On the other hand, in the case where the voltage $V_{IN1}$ of the input terminal 4 is lower than $V_{TH1}$ and the voltage $V_{IN2}$ of the input terminal 6 is lower than $V_{TH3}$, the switch 14 is connected to the $a_1$ side and the transmission signal is input to the distortion compensation unit 96.

In the case where the voltage $V_{IN1}$ of the input terminal 4 is higher than $V_{TH1}$ and lower than $V_{TH2}$ and the voltage $V_{IN2}$ of the input terminal 6 is lower than $V_{TH3}$, the control unit 93 adds the delay time $t_3$. In the case where the voltage $V_{IN1}$ of the input terminal 4 is higher than $V_{TH1}$ and lower than $V_{TH2}$ and the voltage $V_{IN2}$ of the input terminal 6 is higher than $V_{TH3}$ and lower than $V_{TH4}$, the delay time $t_1$ is added. In other words, the compensation amount of the pulse width of the reference signal is controlled based on the voltage of the input terminal 6.

In the states recited above, the method for evaluating the transmission margin is the same as that of the sixth embodiment described above. In this embodiment, the transmission margin can be evaluated by the control unit 41 changing the drive current of the light emitting element 15.

For example, in the case where the compensation amount of the pulse distortion is larger than the prescribed value, that is, in the case where the delay time $t_3$ is added, a control is performed to reduce the drive current of the light emitting element 15. Here, the delay time $t_3$ is set to be larger than the pulse distortion that increases due to the reduction of the drive current. In such a state, it can be evaluated that there is a transmission margin in both the signal strength and the time axis direction if "L" or "H" is not mixed into the reference signal that is output.

Also, the transmission margins of the time axis direction and the strength direction of the signal can be evaluated by measuring using conditions where the delay time $t_1$ is added and the drive current is increased, conditions where the delay time $t_3$ is added and the drive current is increased, and conditions where the delay time $t_1$ is added and the drive current is reduced.

Hereinabove, according to the semiconductor devices according to the first to seventh embodiments, the pulse width distortion of the optical coupling unit (the light emitting element drive circuit to the optical receiving circuit) of the optically-coupled insulating circuit can be tested; and the direct current sensitivity of the light emitting element and the optical receiving unit can be tested. Further, it is possible to easily implement a test in the state in which the degradation of the light emitting element over time is imitated. Thereby, a semiconductor device can be provided to suppress the demodulation error by ensuring the transmission margin of the optical coupling unit to realize a signal transmission having high integrity.

Embodiments are not limited to the embodiments recited above. It is also possible to set other testing modes by changing the combinations of pulse patterns of the reference signal and the circuit configurations of the transmitting unit and the receiving unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A semiconductor device, comprising:
    an analog/digital conversion unit converting an analog signal into a digital signal;
    a pulse width modulation unit outputting a transmission signal, the transmission signal being a pulse pattern corresponding to the digital signal output from the analog/digital conversion unit;
    a reference signal generation unit generating a reference signal, the reference signal being a fixed pulse pattern;
    a first control unit selecting one from the transmission signal and the reference signal;
    a light emitting element drive unit outputting a drive current based on the transmission signal when the first control unit selects the transmission signal, and based on the reference signal when the first control unit selects the reference signal;
    a light emitting element driven by the drive current output by the light emitting element drive unit to emit an optical signal;
    an optical receiving unit converting a photocurrent of a light receiving element receiving the optical signal into a voltage signal; and
    a demodulation unit demodulating the voltage signal into a digital signal corresponding to the selected one of the transmission signal and the reference signal.

2. The device according to claim 1, wherein the first control unit selects one of a transmitting mode and a testing mode.

3. The device according to claim 1, further comprising at least one input terminal inputting the analog signal to the analog/digital conversion unit,
    wherein the first control unit selects one of the one from the transmission signal and the reference signal based on a voltage input to the input terminal.

4. The device according to claim 3, wherein one of a single-phase input signal and a differential input signal is input to the input terminal.

5. The device according to claim 3, further comprising:
    a distortion compensation unit compensating pulse widths of the transmission signal and the reference signal; and
    a second control unit changing the pulse width of the reference signal by controlling the distortion compensation unit based on the voltage input to the input terminal.

6. The device according to claim 5, wherein the second control unit changes the drive current of the light emitting element by controlling the light emitting element drive unit based on the voltage of the input terminal.

7. The device according to claim 3, further comprising:
    a plurality of the input terminals inputting the analog signal to the analog/digital conversion unit;
    a current source outputting a drive current corresponding to a current input to one input terminal of the plurality of input terminals; and
    a third control unit selecting the output of one of the light emitting element drive unit and the current source to be the drive current for the light emitting element.

8. The device according to claim 7, wherein the current source has a first threshold voltage and operates when a voltage exceeding the first threshold voltage is applied to an input terminal of the plurality of input terminals, and the third control unit has a second threshold voltage and operates when a voltage exceeding the second threshold voltage is applied to the input terminal of the plurality of input terminals.

9. The device according to claim 1, further comprising an average duty ratio detection unit configured to detect an average duty ratio of the voltage signal,
    the average duty ratio detection unit determining whether the voltage signal corresponds to the transmission signal or the reference signal based on the average duty ratio of the voltage signal.

10. The device according to claim 9, wherein:
    the pulse width modulation unit outputs the transmission signal having a first average duty ratio; and
    the reference signal generation unit generates the reference signal having a second average duty ratio different from the first average duty ratio.

11. The device according to claim 9, wherein a modulation method having a constant average duty ratio is used in the pulse width modulation unit.

12. The device according to claim 1, wherein the analog/digital conversion unit converts the analog signal into a digital data signal based on a prescribed clock signal.

13. The device according to claim 12, wherein the demodulation unit demodulates the voltage signal into the digital data signal and the clock signal and outputs the digital data signal and the clock signal.

14. A transmitting circuit, comprising:
    an analog/digital conversion circuit converting an analog signal into a digital signal;
    a pulse width modulation circuit outputting a transmission signal having a pulse pattern corresponding to the digital signal output from the analog/digital conversion circuit;

a reference signal circuit generating a reference signal having a fixed pulse pattern;

a first control circuit configured to select one of the transmission signal and the reference signal; and a light emitting element drive circuit outputting a drive current to a light emitting element, the drive current including the transmission signal when the first control circuit selects the transmission signal and the reference signal when the first control circuit selects the reference signal.

15. The transmitting circuit according to claim 14, further comprising at least one input terminal configured to input the analog signal to the analog/digital conversion circuit, wherein the first control circuit selects the one of the transmission signal and the reference signal based on a voltage input to the input terminal.

16. The transmitting circuit according to claim 14, further comprising:

a plurality of input terminals inputting the analog signal to the analog/digital conversion circuit;

a distortion compensation circuit compensating pulse widths of the transmission signal and the reference signal; and a second control circuit changing the pulse width of the reference signal by controlling the distortion compensation circuit based on a voltage input to one input terminal of the plurality of input terminals.

17. A method for testing a semiconductor device configured to convert an analog signal into a digital signal and output the digital signal, the device including:

an analog/digital conversion unit;

at least one input terminal inputting the analog signal to the analog/digital conversion unit;

a pulse width modulation unit outputting a transmission signal, the transmission signal being a pulse pattern corresponding to the digital signal output from the analog/digital conversion unit;

a reference signal generation unit generating a reference signal, the reference signal being a fixed pulse pattern;

a first control unit selecting one from the transmission signal and the reference signal based on a voltage input to the input terminal;

a light emitting element drive unit outputting a drive current based on the transmission signal or the reference signal selected by the first control unit;

a light emitting element driven by the light emitting element drive unit to emit an optical signal based on the transmission signal or the reference signal;

an optical receiving unit converting a photocurrent of a light receiving element receiving the optical signal into a voltage signal; and a demodulation unit demodulating the voltage signal into a digital signal based on the transmission signal or the reference signal, the method comprising:

inputting a voltage to the input terminal, the voltage being outside a range of a voltage swing of the analog signal input to the input terminal;

selecting the reference signal generation unit by the first control unit;

outputting the drive current from the light emitting element drive unit based on the reference signal;

emitting the optical signal from the light emitting element based on the reference signal;

converting the photocurrent of the light receiving element receiving the optical signal to the voltage signal based on the reference signal for testing a signal based on the voltage signal.

18. The method according to claim 17, wherein the voltage signal is demodulated for detecting a bit error.

19. The method according to claim 17, wherein a pulse width of the voltage signal is detected for testing pulse width distortion.

20. The method according to claim 17, wherein the device further includes:

a plurality of the input terminals;

a distortion compensation unit compensating pulse widths of the transmission signal and the reference signal; and a second control unit changing the pulse width of the reference signal by controlling the distortion compensation unit and changing the drive current of the light emitting element by controlling the light emitting element drive unit based on the voltage input to the input terminal, and the method further comprises:

selecting the reference signal by the first control unit based on the voltage outside the range of the voltage swing of the analog signal input to one of the plurality of input terminals;

changing the drive current and the pulse width of the reference signal by the second control unit based on the voltage outside the range of the voltage swing of the analog signal input to the one of the plurality of input terminals; and detecting a pulse width of the voltage signal for testing a pulse width distortion.

\* \* \* \* \*